United States Patent
Lee et al.

(10) Patent No.: US 9,003,335 B2
(45) Date of Patent: Apr. 7, 2015

(54) MOBILE TERMINAL AND METHOD FOR PROVIDING USER INTERFACE THEREOF

(75) Inventors: Choonjae Lee, Gwangju (KR);
Sangwoon Lee, Gwangmyeong (KR);
Samsick Kim, Suwon (KR); Minjeong Lee, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 57 days.

(21) Appl. No.: 13/469,054

(22) Filed: May 10, 2012

(65) Prior Publication Data

US 2013/0058019 A1    Mar. 7, 2013

(30) Foreign Application Priority Data

Sep. 6, 2011    (KR) .......................... 10-2011-0090339

(51) Int. Cl.
*H05K 7/00* (2006.01)
*G06F 3/0488* (2013.01)

(52) U.S. Cl.
CPC .. *G06F 3/04883* (2013.01); *G06F 2203/04808* (2013.01)

(58) Field of Classification Search
USPC ........... 715/863, 864, 835, 765, 803; 345/173
See application file for complete search history.

(56) References Cited

U.S. PATENT DOCUMENTS

| 5,825,352 | A  | * | 10/1998 | Bisset et al. | ................... | 345/173 |
| 7,515,135 | B2 | * | 4/2009  | Varanda       | ......................... | 345/156 |
| 8,612,033 | B2 | * | 12/2013 | Woo et al.    | ........................ | 700/94  |
| 2006/0026536 | A1 | * | 2/2006 | Hotelling et al. | ............. | 715/863 |
| 2006/0101293 | A1 | * | 5/2006 | Chandley et al. | ............. | 713/300 |
| 2007/0177803 | A1 | * | 8/2007 | Elias et al. | ..................... | 382/188 |
| 2008/0148030 | A1 | * | 6/2008 | Goffin | .............................. | 713/1 |
| 2008/0186285 | A1 | * | 8/2008 | Shimizu | ........................ | 345/173 |
| 2009/0158191 | A1 | * | 6/2009 | Varanda | ........................ | 715/773 |
| 2009/0228818 | A1 | * | 9/2009 | Hebard | ........................ | 715/768 |
| 2010/0223563 | A1 | * | 9/2010 | Green | ........................... | 715/762 |
| 2011/0035708 | A1 |   | 2/2011 | Damale |   |   |
| 2011/0047461 | A1 |   | 2/2011 | Bargmann |   |   |
| 2011/0119610 | A1 | * | 5/2011 | Hackborn et al. | ............ | 715/768 |

(Continued)

FOREIGN PATENT DOCUMENTS

| CN | 101359334 | 2/2009 |
| CN | 101404687 | 4/2009 |

(Continued)

OTHER PUBLICATIONS

Buring, et al., "User Interaction with Scatterplots on Small Screens—A Comparative Evaluation of Geometric-Semantic Zoom and Fisheye Distortion", IEEE Transactions on Visualization and Computer Graphics, vol. 12, No. 5, Sep. 2006, 8 pages, XP11150882.

(Continued)

*Primary Examiner* — Doon Chow
*Assistant Examiner* — Wendy Nicholas
(74) *Attorney, Agent, or Firm* — Lee, Hong, Degerman, Kang & Waimey

(57) ABSTRACT

The present disclosure relates to a mobile terminal capable of displaying a plurality of objects on a wallpaper, and a method for providing a user interface thereof. The mobile terminal includes a display unit to display a plurality of objects on a wallpaper, a sensing unit to detect a touch input on the display unit, and a controller to control the plurality of objects to be invisible in response to the touch input such that portions of the wallpaper obscured by the plurality of objects are visible.

20 Claims, 31 Drawing Sheets

(56) References Cited

U.S. PATENT DOCUMENTS

| | | | |
|---|---|---|---|
| 2011/0254792 A1* | 10/2011 | Waters et al. | 345/173 |
| 2011/0316844 A1* | 12/2011 | Alberth et al. | 345/214 |
| 2012/0036450 A1* | 2/2012 | Canton | 715/748 |
| 2012/0081303 A1* | 4/2012 | Cassar et al. | 345/173 |

FOREIGN PATENT DOCUMENTS

| | | | |
|---|---|---|---|
| CN | 101527745 | 9/2009 | |
| CN | 101656784 | 2/2010 | |
| CN | 101963885 | 2/2011 | |
| EP | 684542 A1 * | 11/1995 | G06F 3/033 |
| EP | 2045700 | 4/2009 | |

OTHER PUBLICATIONS

European Patent Office Application Serial No. 12004457.3, Search Report dated Jan. 30, 2013, 9 pages.

The State Intellectual Property Office of the People's Republic of China Application Serial No. 201210208977.3, Office Action dated Dec. 24, 2014, 15 pages.

* cited by examiner

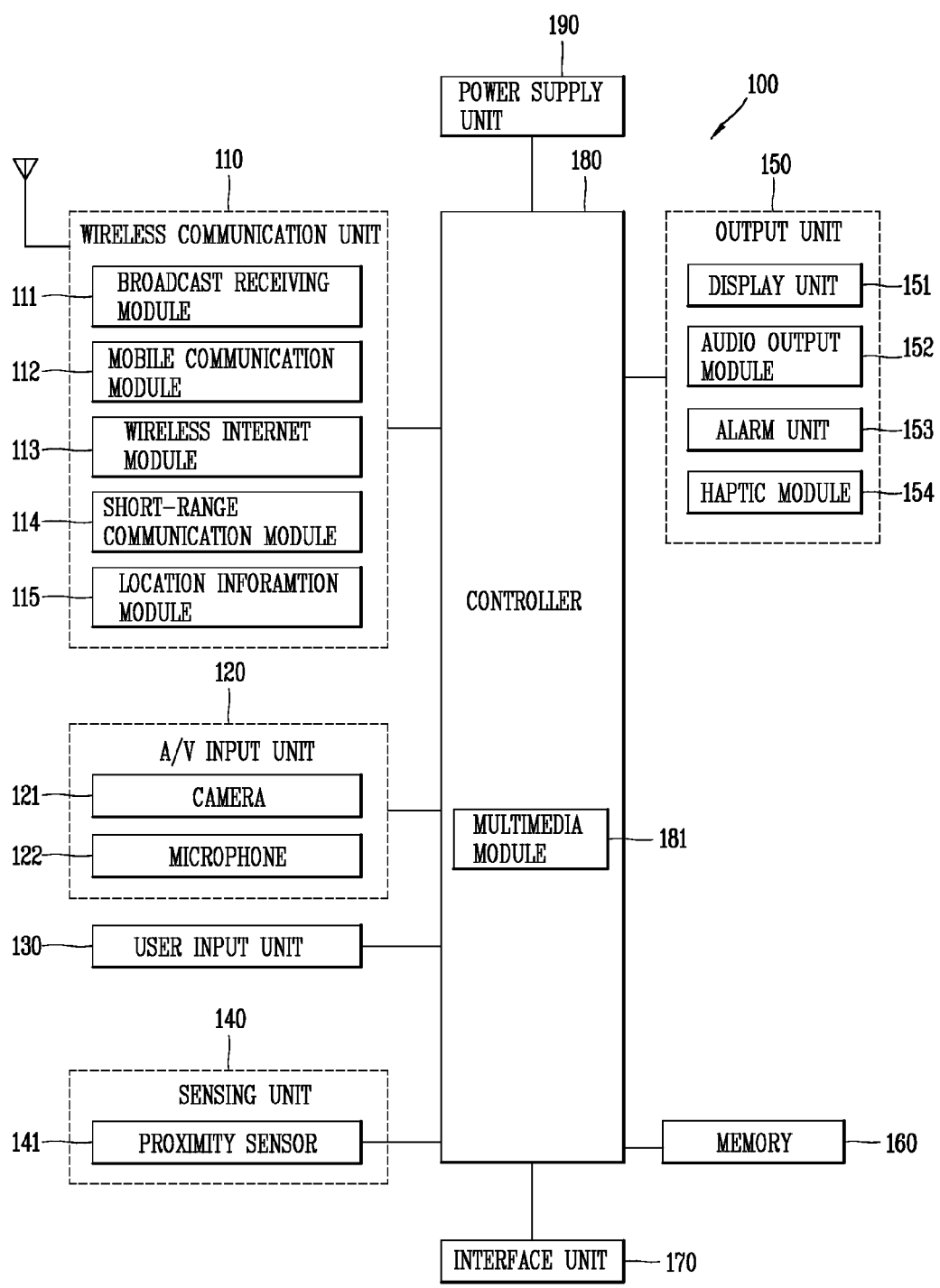

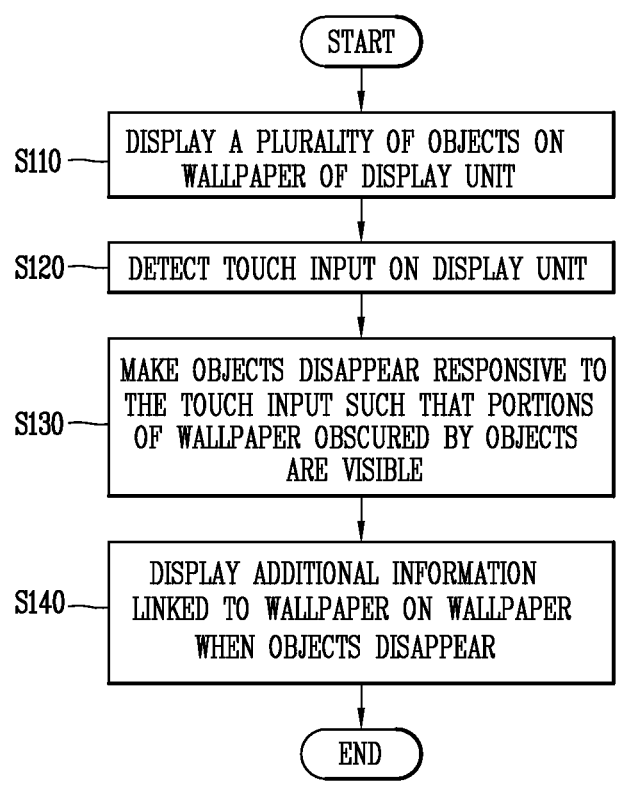

MOBILE TERMINAL AND METHOD FOR PROVIDING USER INTERFACE THEREOF

CROSS-REFERENCE TO RELATED APPLICATION

Pursuant to 35 U.S.C. §119(a), this application claims the benefit of earlier filing date and right of priority to Korean Patent Application No. 10-2011-0090339, filed on Sep. 6, 2011, the contents of which are incorporated by reference herein in its entirety.

BACKGROUND OF THE INVENTION

1. Field of the Invention

This specification relates to a mobile terminal, and particularly, to a mobile terminal capable of displaying a plurality of objects on a wallpaper, and a method for providing a user interface thereof.

2. Background of the Invention

Terminals may be divided into mobile/portable terminals and stationary terminals according to their mobilities. Also, the portable terminals may be categorized into a handheld terminal and a vehicle mount terminal according to whether it is directly portable by a user.

As it becomes multifunctional, the terminal can be allowed to capture still images or moving images, play music or video files, play games, receive broadcast and the like, so as to be implemented as an integrated multimedia player.

Various attempts have been done for the terminals by hardware or software in order to implement such complicated functions.

A screen of a mobile terminal, for example, a home screen can display various types of objects on a wallpaper thereof. However, as the number of objects displayed on the wallpaper increases, portions obscured by the objects increase on the wallpaper, which causes user's inconvenience that the user is unable to view the full wallpaper.

SUMMARY OF THE INVENTION

Therefore, an aspect of the detailed description is to provide a mobile terminal capable of improving user's convenience in relation to control of objects displayed on a screen, and a user interface thereof.

To achieve these and other advantages and in accordance with the purpose of this specification, as embodied and broadly described herein, there is provided a mobile terminal including a display unit to display a plurality of objects on a wallpaper, a sensing unit to detect a touch input on the display unit, and a controller to control the plurality of objects to be invisible in response to the touch input such that portions of the wallpaper obscured by the plurality of objects are visible.

In the one exemplary embodiment, the controller may control the plurality of objects to be moved away from first and second touch points, respectively, so as to be invisible when it is detected that the first and second touch points of the touch input are moved away from each other. The display unit may display additional information linked to the wallpaper on the wallpaper when the plurality of objects disappear.

In the one exemplary embodiment, the controller may control the disappeared objects to appear on the wallpaper when it is detected that the first and second touch points of the touch input are moved close to each other after the plurality of objects disappear. The controller may change a content used as the wallpaper and the additional information into another content and additional information corresponding to the another content, in response to a touch input detected after the plurality of objects disappear.

In the one exemplary embodiment, the display unit may display additional information, which is linked to the wallpaper and variable according to moved distances of the plurality of objects, on the wallpaper when the plurality of objects are moved.

In the one exemplary embodiment, the controller may revoke the movement of the plurality of objects when a revoke command is detected while the plurality of objects are moved.

In the one exemplary embodiment, the wallpaper may be divided into first and second areas. The controller may control the plurality of objects to disappear when the touch input is detected on the first area, and reproduce a content stored in a memory when the touch input is detected on the second area.

In the one exemplary embodiment, the display unit may display additional information linked to the wallpaper on the wallpaper, in response to a touch input detected after the plurality of objects disappear. The display unit may display contents sharing tag information of a content used as the wallpaper.

In the one exemplary embodiment, the display unit may display a shortcut button for setting the wallpaper on the wallpaper when the plurality of objects disappear. The display unit may also display contents candidates to be used as the wallpaper when a setting mode for the wallpaper is executed by using the shortcut button. In addition, the display unit may display a tool menu for editing the wallpaper when a setting mode for the wallpaper is executed by using the shortcut button.

In the one exemplary embodiment, the controller may execute an application for managing contents used as the wallpaper when the plurality of objects disappear. The controller may activate a voice recognition sensor and a face recognition sensor when the application executed in response to disappearing of the plurality of objects provides a voice recognition function and a face recognition function. The controller may update a content used as the wallpaper based on current time information and position information when the plurality objects disappear.

In the one exemplary embodiment, the controller may release a power saving mode when the plurality of objects disappear while the wallpaper is displayed in the power saving mode. The controller may also activate at least one of an animation effect, a sound effect and a 3D effect for a content used as the wallpaper when the plurality of objects disappear.

In accordance with another exemplary embodiment of this specification, there is provided with a mobile terminal a display unit to display a plurality of objects on a wallpaper, a connection terminal connected to an external device to allow for exchange of signals and power with the external device, and a controller to control the plurality of objects to be invisible such that portions of the wallpaper obscured by the plurality of objects are visible, when a user input is not received within a reference time after the connection between the connection terminal and the external device is detected.

In the another exemplary embodiment, the controller may control the disappeared objects to be visible on the wallpaper when a separation of the external device from the connection terminal is detected. The display unit may display additional information on the wallpaper when the plurality of objects disappear, the additional information being linked to the wallpaper.

To achieve these and other advantages and in accordance with the purpose of this specification, as embodied and broadly described herein, there is provided a method for providing a user interface in a mobile terminal including displaying a plurality of objects on a wallpaper of a display unit, detecting a touch input on the display unit, and making the plurality of objects invisible, in response to the touch input, such that portions of the wallpaper obscured by the plurality of objects are visible.

In the one exemplary embodiment, in the step of making the plurality of objects invisible, when it is detected that first and second touch points of the touch input are moved away from each other, the plurality of objects may be moved away from the first and second touch points, respectively, to be invisible.

In the one exemplary embodiment, the method may further include displaying additional information on the wallpaper when the plurality of objects disappear, the additional information being linked to the wallpaper.

In the one exemplary embodiment, the method may further include displaying additional information, which is linked to the wallpaper and variable according to moved distances of the plurality of objects, on the wallpaper when the plurality of objects are moved.

In the one exemplary embodiment, the method may further include making the disappeared objects visible on the wallpaper when it is detected that the first and second touch points of the touch input are moved close to each other after the plurality of objects disappear.

In the one exemplary embodiment, the method may further include executing an application for managing a content used as the wallpaper when the plurality of objects disappear.

In the one exemplary embodiment, the method may further include updating the content used as the wallpaper based on time information and position information when the plurality of objects disappear.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIG. 1 is a block diagram of a mobile terminal in accordance with an exemplary embodiment of this specification;

FIG. 3 is a flowchart showing a first exemplary embodiment of a method for providing a user interface in a mobile terminal in accordance with this specification;

DETAILED DESCRIPTION OF THE INVENTION

Figure 2A:
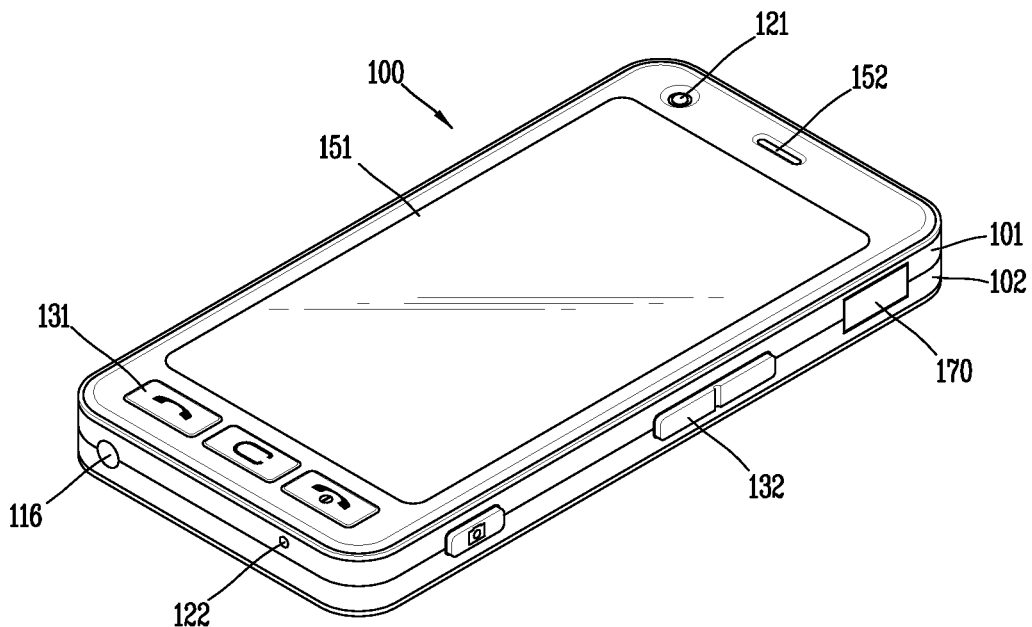
FIGS. 2A and 2B are perspective views showing an appearance of the mobile terminal.

Description will now be given in detail of the exemplary embodiments, with reference to the accompanying drawings. For the sake of brief description with reference to the drawings, the same or equivalent components will be provided with the same reference numbers, and description thereof will not be repeated.

FIG. 1 is a block diagram of a mobile terminal 100 in accordance with one exemplary embodiment. The mobile terminal 100 may comprise components, such as a wireless communication unit 110, an Audio/Video (A/V) input unit 120, a user input unit 130, a sensing unit 140, an output unit 150, a memory 160, an interface unit 170, a controller 180, a power supply 190 and the like. FIG. 1 shows the mobile terminal 100 having various components, but it is understood that implementing all of the illustrated components is not a requirement. Greater or fewer components may alternatively be implemented.

Hereinafter, each component 110 to 190 of the mobile terminal 100 is described in sequence.

The wireless communication unit 110 may typically include one or more modules which permit wireless communications between the mobile terminal 100 and a wireless communication system or between the mobile terminal 100 and a network within which the mobile terminal 100 is located. For example, the wireless communication unit 110 may include a broadcast receiving module 111, a mobile communication module 112, a wireless Internet module 113, a short-range communication module 114, a location information module 115 and the like.

The broadcast receiving module 111 receives a broadcast signal and/or broadcast associated information from an external broadcast managing entity via a broadcast channel. Examples of broadcast associated information may include information associated with a broadcast channel, a broadcast program, a broadcast service provider, and the like. The broadcast associated information may be provided via a mobile communication network, and received by the mobile communication module 112. The broadcast signal and the broadcast associated information received via the broadcast receiving module 111 may be stored in the memory 160.

The mobile communication module 112 transmits/receives wireless signals to/from at least one of network entities (e.g., base station, an external mobile terminal, a server, etc.) on a mobile communication network. Here, the wireless signals may include audio call signal, video (telephony) call signal, or various formats of data according to transmission/reception of text/multimedia messages.

The wireless Internet module 113 supports wireless Internet access for the mobile terminal. This module may be internally or externally coupled to the mobile terminal 100. Examples of such wireless Internet access may include Wireless LAN (WLAN) (Wi-Fi), Wireless Broadband (Wibro), Worldwide Interoperability for Microwave Access (Wimax), High Speed Downlink Packet Access (HSDPA) and the like.

The short-range communication module 114 denotes a module for short-range communications. Suitable technologies for implementing this module may include BLUETOOTH™, Radio Frequency IDentification (RFID), Infrared Data Association (IrDA), Ultra-WideBand (UWB), ZigBee™, and the like.

The location information module 115 denotes a module for detecting or calculating a position of a mobile terminal. An example of the location information module 115 may include a Global Position System (GPS) module.

Referring to FIG. 1, the A/V input unit 120 is configured to provide audio or video signal input to the mobile terminal. The A/V input unit 120 may include a camera 121 and a microphone 122. The camera 121 receives and processes image frames of still pictures or video obtained by image sensors in a video call mode or a capturing mode. The processed image frames may be displayed on a display unit 151. The image frames processed by the camera 121 may be stored in the memory 160 or transmitted to the exterior via the wireless communication unit 110. Two or more cameras 121 may be provided according to the configuration of the mobile terminal.

The microphone 122 may receive an external audio signal while the mobile terminal is in a particular mode, such as a phone call mode, a recording mode, a voice recognition mode, or the like. This audio signal is processed into digital data. The processed digital data is converted for output into a format transmittable to a mobile communication base station via the mobile communication module 112 in case of the phone call mode. The microphone 122 may include assorted noise removing algorithms to remove noise generated in the course of receiving the external audio signal.

The user input unit 130 may generate input data input by a user to control the operation of the mobile terminal. The user input unit 130 may include a keypad, a dome switch, a touchpad (e.g., static pressure/capacitance), a jog wheel, a jog switch and the like.

The sensing unit 140 provides status measurements of various aspects of the mobile terminal. For instance, the sensing unit 140 may detect an open/close status of the mobile terminal, a change in a location of the mobile terminal 100, a presence or absence of user contact with the mobile terminal 100, the location of the mobile terminal 100, acceleration/deceleration of the mobile terminal 100, and the like, so as to generate a sensing signal for controlling the operation of the mobile terminal 100. For example, regarding a slide-type mobile terminal, the sensing unit 140 may sense whether a sliding portion of the mobile terminal is open or closed. Other examples include sensing functions, such as the sensing unit 140 sensing the presence or absence of power provided by the power supply 190, the presence or absence of a coupling or other connection between the interface unit 170 and an external device.

The sensing unit 140 may include a proximity sensor 141. Also, the sensing unit 140 may include a touch sensor (not shown) to detect a touch operation on the display unit 151.

The touch sensor may be implemented as a touch film, a touch sheet, a touchpad and the like. The touch sensor may be configured to convert changes of a pressure applied to a specific part of the display 151, or a capacitance occurring from a specific part of the display 151, into electric input signals. Also, the touch sensor may be configured to sense not only a touched position and a touched area, but also a touch pressure.

Here, if the display unit 151 and a touch sensitive sensor (referred to as a touch sensor) have a layered structure therebetween, the structure may be referred to as a touch screen. The display unit 151 may be used as an input device rather than an output device.

When touch inputs are sensed by the touch sensors, corresponding signals are transmitted to a touch controller. The touch controller processes the received signals, and then transmits corresponding data to the controller 180. Accordingly, the controller 180 may sense which region of the display unit 151 has been touched.

For a capacitance type touch screen, it may be configured to detect the proximity of a target to be sensed based on changed in electric fields in response to the proximity of the target to be sensed. This type of touch screen may be classified into the proximity sensor 141.

The proximity sensor 141 indicates a sensor to sense presence or absence of an object approaching to a surface to be sensed, or an object disposed near a surface to be sensed, by using an electromagnetic field or infrared rays without a mechanical contact. The proximity sensor 141 has a longer lifespan and a more enhanced utility than a contact sensor. The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on.

Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'.

The proximity sensor 141 senses proximity touch, and proximity touch patterns (e.g., distance, direction, speed, time, position, moving status, etc.). Information relating to the sensed proximity touch and the sensed proximity touch patterns may be output onto the touch screen.

The output unit 150 is configured to output an audio signal, a video signal or an alarm signal. The output unit 150 may include a display unit 151, an audio output module 152, an alarm 153, a haptic module 154 and the like.

The display unit 151 may output information processed in the mobile terminal 100. For example, when the mobile terminal is operating in a phone call mode, the display unit 151 will provide a User Interface (UI) or a Graphic User Interface (GUI) which includes information associated with the call. As another example, if the mobile terminal is in a video call mode or a capturing mode, the display unit 151 may additionally or alternatively display images captured and/or received, UI, or GUI.

The display unit 151 may be implemented using, for example, a Liquid Crystal Display (LCD), a Thin Film Transistor-Liquid Crystal Display (TFT-LCD), an Organic Light-Emitting Diode (OLED), a flexible display, a three-dimensional (3D) display, an e-ink display or the like.

Some of the displays can be configured to be transparent such that it is possible to see the exterior therethrough. These displays may be called transparent displays. A representative example of the transparent display may include a Transparent Organic Light Emitting Diode (TOLED), and the like. The rear surface of the display unit 151 may also be implemented to be optically transparent. Under this configuration, a user can view an object positioned at a rear side of a terminal body through a region occupied by the display unit 151 of the terminal body.

The display unit 151 may be implemented in two or more in number according to a configured aspect of the mobile terminal 100. For instance, a plurality of the display units 151 may be arranged on one surface to be spaced apart from or integrated with each other, or may be arranged on different surfaces.

The audio output module 152 may output audio data received from the wireless communication unit 110 or stored in the memory 160, in a call-receiving mode, a call-placing mode, a recording mode, a voice recognition mode, a broadcast reception mode, and so on. The audio output module 152 may output audio signals relating to functions performed in the mobile terminal 100, e.g., sound alarming a call received or a message received, and so on. The audio output module 152 may include a receiver, a speaker, a buzzer, and so on.

The alarm 153 outputs signals notifying occurrence of events from the mobile terminal 100. The events occurring from the mobile terminal 100 may include call received, message received, key signal input, touch input, and so on. The alarm 153 may output not only video or audio signals, but also other types of signals such as signals notifying occurrence of events in a vibration manner. Since the video or audio signals can be output through the display unit 151 or the audio output unit 152, the display unit 151 and the audio output module 152 may be categorized into a part of the alarm 153.

The haptic module 154 generates various tactile effects which a user can feel. A representative example of the tactile effects generated by the haptic module 154 includes vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects (signals) through a user's direct contact, or a user's muscular sense using a finger or a hand. The haptic module 154 may be implemented in two or more in number according to the configuration of the mobile terminal 100.

The memory 160 may store a program for the processing and control of the controller 180. Alternatively, the memory 160 may temporarily store input/output data (e.g., phonebook data, messages, still images, video and the like). Also, the memory 160 may store data related to various patterns of vibrations and audio output upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. Also, the mobile terminal 100 may operate a web storage which performs the storage function of the memory 160 on the Internet.

The interface unit 170 may generally be implemented to interface the mobile terminal with external devices. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the mobile terminal 100, which may include a User Identity Module (UIM), a Subscriber Identity Module (SIM), and the like. Also, the device having the identification module (hereinafter, referred to as 'identification device') may be implemented in a type of smart card. Hence, the identification device can be coupled to the mobile terminal 100 via a port.

Also, the interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. Such various command signals or power inputted from the cradle may operate as signals for recognizing that the mobile terminal 100 has accurately been mounted to the cradle.

The controller 180 typically controls the overall operations of the mobile terminal 100. For example, the controller 180 performs the control and processing associated with telephony calls, data communications, video calls, and the like. The controller 180 may include a multimedia module 181 which provides multimedia playback. The multimedia module 181 may be configured as part of the controller 180 or as a separate component. The controller 180 can perform a pattern recognition processing so as to recognize writing or drawing input on the touch screen as text or image.

The power supply unit 190 provides power required by various components under the control of the controller 180. The provided power may be internal power, external power, or combination thereof.

Various embodiments described herein may be implemented in a computer-readable medium using, for example, software, hardware, or some combination thereof.

For a hardware implementation, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro processors, other electronic units designed to perform the functions described herein, or a selective combination thereof. In some cases, such embodiments are implemented by the controller 180.

For software implementation, the embodiments such as procedures and functions may be implemented together with separate software modules each of which performs at least one of functions and operations. The software codes can be implemented with a software application written in any suitable programming language. Also, the software codes may be stored in the memory 160 and executed by the controller 180.

Hereinafter, a processing method for a user input in the mobile terminal 100 will be described.

The user input unit 130 may be manipulated to allow inputting of commands for controlling operations of the mobile terminal 100, and include a plurality of first manipulation units. The plurality of manipulation units may be referred to as a manipulating portion. Such manipulating portion can employ any tactile manner that a user can touch or tap for manipulation.

Various types of visible information may be displayed on the display unit 151. Such information may be displayed in several forms, such as character, number, symbol, graphic, icon or the like, and also displayed in form of a three-dimensional image. For input of the information, at least one of characters, numbers, graphics or icons may be arranged and displayed in a preset configuration, thus being implemented in the form of a keypad. Such keypad may be called 'soft key.'

The display unit 151 may be operated as a single entire region or by being divided into a plurality of regions. For the latter, the plurality of regions may cooperate with one another.

For example, an output window and an input window may be displayed at upper and lower portions of the display unit 151, respectively. The output window and the input window are allocated regions for outputting or inputting of information. Soft keys representing numbers for inputting telephone numbers or the like may be output on the input window. When a soft key is touched, a number or the like corresponding to the touched soft key is output on the output window. Upon manipulating the manipulation unit, a call connection for a telephone number displayed on the output window is attempted or a text displayed on the output window may be input into an application.

The display 151 or the touch pad may be scrolled to receive a touch input. A user may scroll the display 151 or the touch pad to move a cursor or pointer positioned on an object (subject), e.g., an icon or the like, displayed on the display 151. In addition, in case of moving a finger on the display 151 or the touch pad, the path of the finger being moved may be visibly displayed on the display 151, which can be useful upon editing an image displayed on the display 151.

One function of the mobile terminal may be executed in correspondence with a case where the display 151 (touch screen) and the touch pad are touched together within a preset time. An example of being touched together may include clamping a terminal body with the user's thumb and index fingers. The one function, for example, may be activating or deactivating of the display 151 or the touch pad.

Figure 2B:
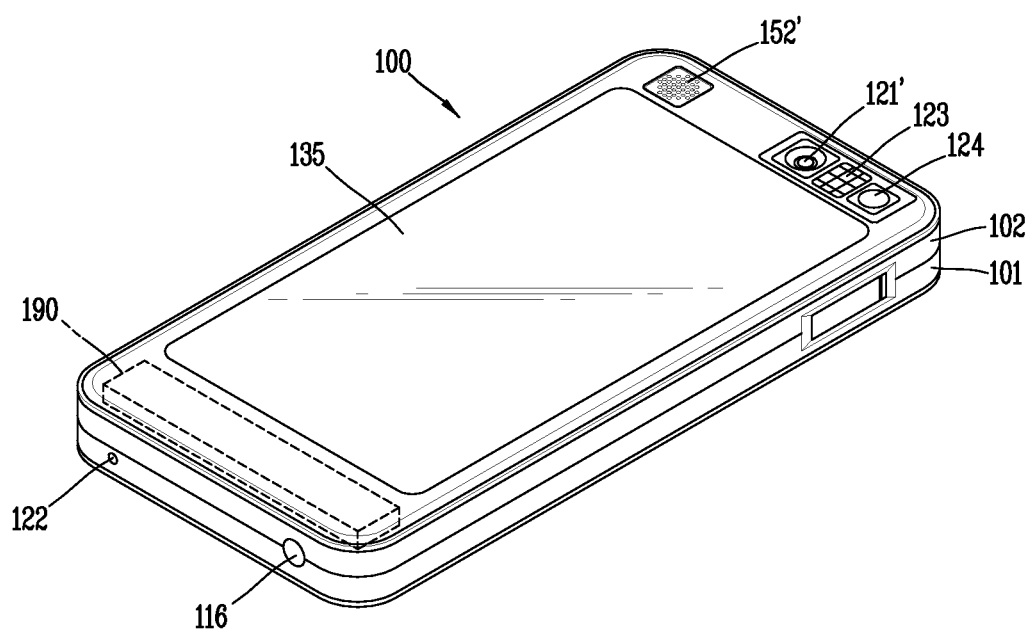

FIGS. 2A and 2B are perspective views showing an appearance of the mobile terminal. FIG. 2A shows a front surface and one side surface of the mobile terminal 100, and FIG. 2B shows a rear surface and another side surface of the mobile terminal 100.

As shown in FIG. 2A, the mobile terminal 100 may include a bar-type terminal body. However, this detailed description may be applicable, but not limited to, various structures, such as a slide type, a folder type, a swing type, a swivel type and the like having two or more bodies coupled to be relatively movable with each other.

The terminal body may include a case (or referred to as casing, housing, cover, etc.) defining an appearance of the mobile terminal 100. In this exemplary embodiment, the case may be divided into a front case 101 and a rear case 102. A space formed between the front and rear cases 101 and 102 may accommodate various electronic components. At least one intermediate case may further be disposed between the front and the rear cases 101 and 102.

Such cases may be injected using a synthetic resin or be formed of a metal, such as stainless steel (STS), titanium (Ti) or the like.

The terminal body, generally the front case 101 is shown having a display unit 151, an audio output module 152, a camera 121, a user input unit 130 (see FIG. 1), a microphone 122, an interface unit 170, and the like.

The display unit 151 may occupy most of a main surface of the front case 101. The audio output module 152 and the camera 121 may be disposed near one of both end portions of the display unit 151, and the user input unit 131 and the microphone 122 on the other end portion of the display unit 151. The user input unit 132, the interface unit 170 and the like may be disposed on side surfaces of the front and rear cases 101 and 102.

The user input unit 130 may be manipulated to allow inputting of commands for controlling operations of the mobile terminal 100, and include a plurality of first manipulation units 131, 132.

The first and second manipulation units 131, 132 may be set to allow inputting of various contents. For example, the first manipulation unit 131 may be configured to input commands such as START, END, SCROLL or the like, and the second manipulation unit 132 may be configured to input commands, such as a volume adjustment of sounds output from the audio output module 152, conversion of the display unit 151 into a touch recognition mode, or the like.

Referring to FIG. 2B, a rear face of the terminal body, namely, the rear case 102 may further be provided with a camera 121'. The camera 121' faces a direction which is opposite to a direction faced by the camera 121 (see FIG. 2A), and may have different pixels from those of the camera 121.

For example, the camera 121 may operate with relatively lower pixels (lower resolution). Thus, the camera 121 may be useful when a user can capture his face and send it to another party during a video call or the like. On the other hand, the camera 121' may operate with a relatively higher pixels (higher resolution) such that it can be useful for a user to obtain higher quality pictures for later use.

The cameras 121 and 121' may be installed in the terminal body to be rotatable or popped up.

A flash 123 and a mirror 124 may additionally be disposed adjacent to the camera 121'. The flash 123 operates in conjunction with the camera 121' when taking a picture using the camera 121'. The mirror 124 can cooperate with the camera 121' to allow a user to photograph himself in a self-portrait mode.

An audio output module 152' may further be disposed at a rear face of the terminal body. The audio output module 152' can cooperate with the audio output module 152 (see FIG. 2) to provide stereo output. Also, the audio output module 152' may be configured to operate as a speakerphone.

A broadcast signal receiving antenna 116 may further be disposed at one side of the terminal body in addition to an antenna for communications, for example. The antenna 116 configuring a part of the broadcast receiving module 111 (see FIG. 1) may be retractable into the terminal body.

A power supply unit 190 for supplying power to the mobile terminal 100 may be mounted in the terminal body. The power supply unit 190 may be mounted in the terminal body or detachably coupled directly onto the outside of the terminal body.

The rear case 102 may be further provided with a touchpad 135 for detecting a touch input. Similar to the display unit 151, the touchpad 135 may be implemented as a light-transmissive type. Also, a rear display unit may further be mounted to output visual information on the touchpad 135. Here, information output on both the front display unit 151 and the rear display unit may be controlled by the touchpad 135.

The touchpad 135 may operate cooperative with the display unit 151 of the front case 101. The touchpad 135 may be disposed at a rear side of the display unit 151 in parallel to the display unit 151. The touchpad 135 may have a size the same as or smaller than that of the display unit 151.

When a plurality of objects are displayed on a wallpaper of the display unit 151 of the mobile terminal 100, the wallpaper may be obscured by the plurality of objects. However, a user desires to view the full wallpaper at any time. Hereinafter, description will be given of a method for providing a user interface in a mobile terminal, capable of allowing a user to view a full wallpaper obscured by a plurality of objects with reference to the accompanying drawings.

FIG. 3 is a flowchart showing a first exemplary embodiment of a method for providing a user interface in a mobile terminal in accordance with this specification. As shown in FIG. 3, a method for providing a user interface in a mobile terminal may include displaying a plurality of objects on a wallpaper of a display unit (S110). Here, the plurality of objects may include icons, widgets, application execution menus, thumbnail images and the like.

Afterwards, with the objects displayed on the wallpaper, a step (S120) of detecting a touch input on the display unit may be executed, and then a step (S130) of making the objects invisible in response to the touch input such that the portions obscured by the objects are visible may be executed.

For example, an operation of making objects invisible in response to a multi-touch input, for example, a pinch-in gesture or pinch-out gesture may be performed. Here, the pinch-in gesture indicates a gesture of setting two fingers apart on a screen, and the pinch-out gesture is opposite to the pinch-in gesture, namely, setting two fingers close.

When the objects disappears, namely, the wallpaper is fully displayed, a step (S140) of displaying additional information associated with the wallpaper on the wallpaper may be performed. Here, the additional information indicates preset information for contents used as the wallpaper or information linked thereto.

In accordance with the exemplary embodiment of this specification, after the objects disappear from the wallpaper, the disappeared objects may come into view on their original positions in response to the pinch-in or pinch-out gesture. Also, the operation of making the disappeared objects come into view again may be executed in response to an input applied onto a user input unit (for example, hard key) provided on the terminal body. Also, when a specific application executed is then terminated in response to an interruption generated in the mobile terminal, the operation of making the disappeared objects come into view may be performed. The disappeared objects may also come into view again after a preset time elapses since the objects disappeared.

As aforementioned, according to the method for providing the user interface in the mobile terminal, a plurality of objects displayed on a wallpaper may be made invisible in response to a touch input on a display unit. Accordingly, a user can view the full wallpaper without portions obscured by the objects even without performing complicated operations.

FIGS. 4 to 11 are overviews showing exemplary operations of the mobile terminal according to the user interface providing method of FIG. 3.

Figure 4:
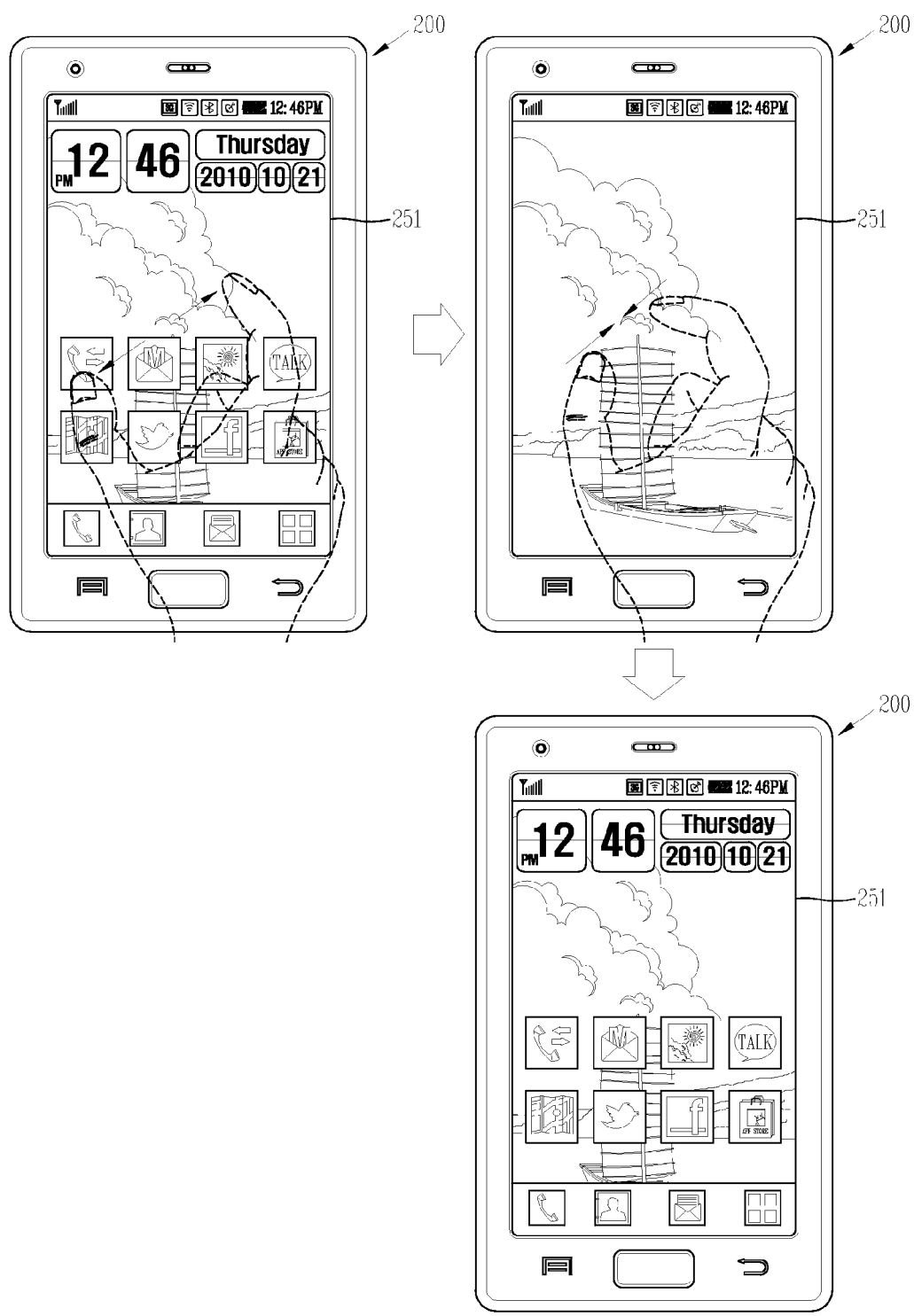
FIGS. 4 to 11 are overviews showing exemplary operations of the mobile terminal according to the user interface providing method of FIG. 3.

As shown in FIG. 4, a display unit 251 may display a plurality of objects on a wallpaper. Here, as aforementioned, the objects displayed on the wallpaper may include icons, widgets, application execution menus, thumbnail images and the like.

The wallpaper of the display unit 251 may be set by a user using various contents. For example, text, image and video stored in a memory or downloaded contents from a server may be set as a wallpaper. Also, a specific execution screen of an application may be used as a wallpaper.

As shown, when objects are displayed on a wallpaper, the wallpaper is partially obscured by the objects. In this state, when a touch input on the display unit 251 is detected by a sensing unit (not shown), a controller (not shown) may respond to the touch input to make the objects invisible such that the portions of the wallpaper obscured by the objects are visible. In more detail, when it is detected as a multi-touch input that first and second touch points are moved away from each other, that is, when a pinch-in gesture is detected, the controller may perform an operation of making the objects displayed on the wallpaper invisible. Consequently, the full wallpaper may be displayed.

In the exemplary embodiment, when the pinch-in gesture is detected in a state that one of the plurality of objects is selected, the controller may perform the operation of making the other objects invisible except for the selected object.

Afterwards, when a touch input is detected by the sensing unit in the objects-disappeared state, that is, when the pinch-out gesture is detected, the controller may perform the operation of making the disappeared objects come into view on the wallpaper in response to the touch input. In more detail, when it is detected as a multi-touch input that first and second touch points are moved close to each other, the controller may make the disappeared objects displayed on their original positions.

Figure 5:
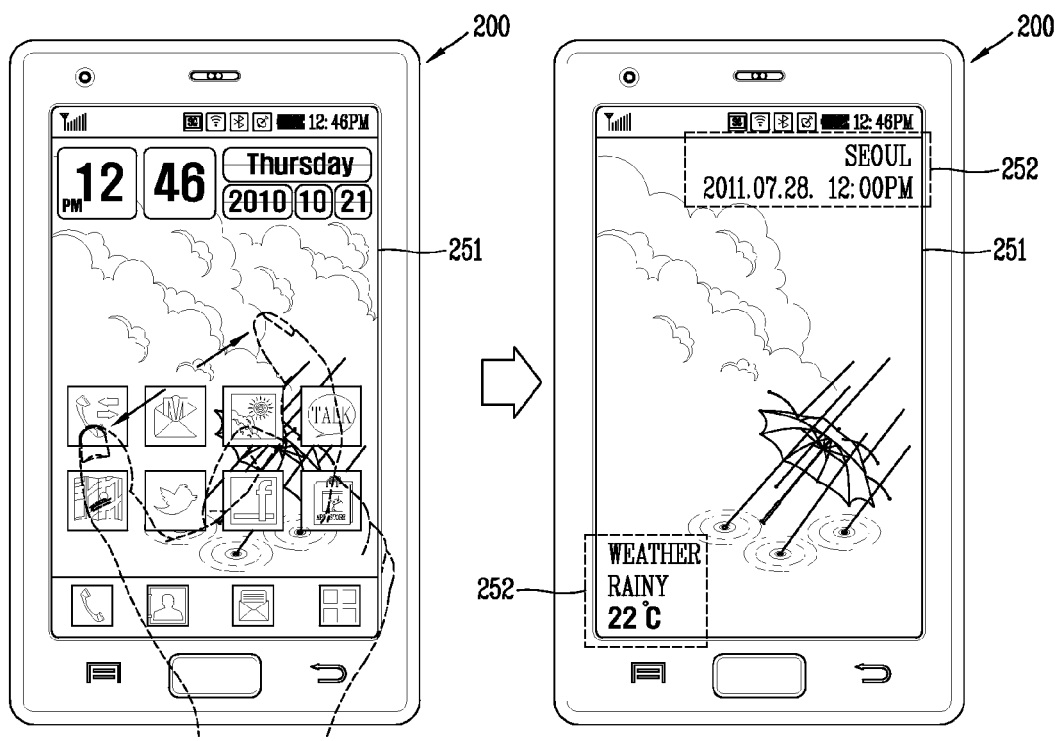

As shown in FIG. 5, as a wallpaper of the display unit 251, a live wallpaper showing a weather may be used. For example, a content which dynamically represents a rainy scene may be used as the wallpaper.

When objects disappear from the wallpaper in response to a touch input (e.g., pinch-in gesture) on the display unit 251, the display unit 251 may display on the wallpaper additional information 252 linked to the wallpaper, namely, additional information set to or linked to the content used as the wallpaper. The additional information linked to the live wallpaper showing the weather, for example, may include area information, date and time information, current weather information, weather forecast information (area-basis, time-basis) and the like.

Figure 6:
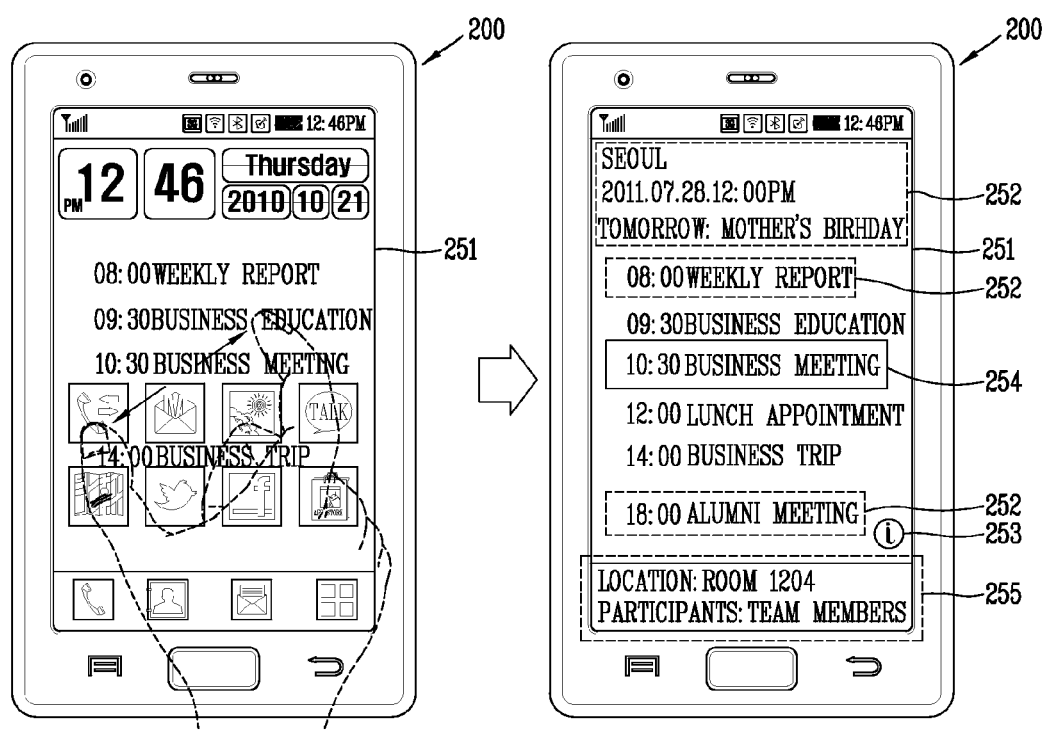

As shown in FIG. 6, an execution screen of an application may be used as the wallpaper of the display unit 251. For example, an execution screen of an application for managing personal schedule or a corresponding captured screen may be used as the wallpaper.

When objects are displayed on the wallpaper, some items which are not obscured by the objects, among personal schedules, may be merely displayed. Here, personal schedule items close to the current time may be preferentially displayed.

When the objects disappear from the wallpaper in response to a touch input (e.g., pinch-in gesture) on the display unit 251, the display unit 251 may display additional information 252 linked to the wallpaper indicating the personal schedule. The additional information 252, for example, may include area information, date and time information, personal schedule information which was not displayed on a previous screen, anniversary information and the like.

When the objects disappear from the wallpaper, the display unit 251 may also display a shortcut button 253 in form of an icon for executing an application corresponding to the wallpaper, for example, an application for managing contents used as the wallpaper.

When the objects disappear from the wallpaper, the display unit 251 may also display visual information 254, which highlights a personal schedule item linked to the current time or the closest time after the current time, and detailed schedule information 255, which corresponds to the highlighted personal schedule item. Here, the highlighted personal schedule item may be selected by a user input.

Figure 7:
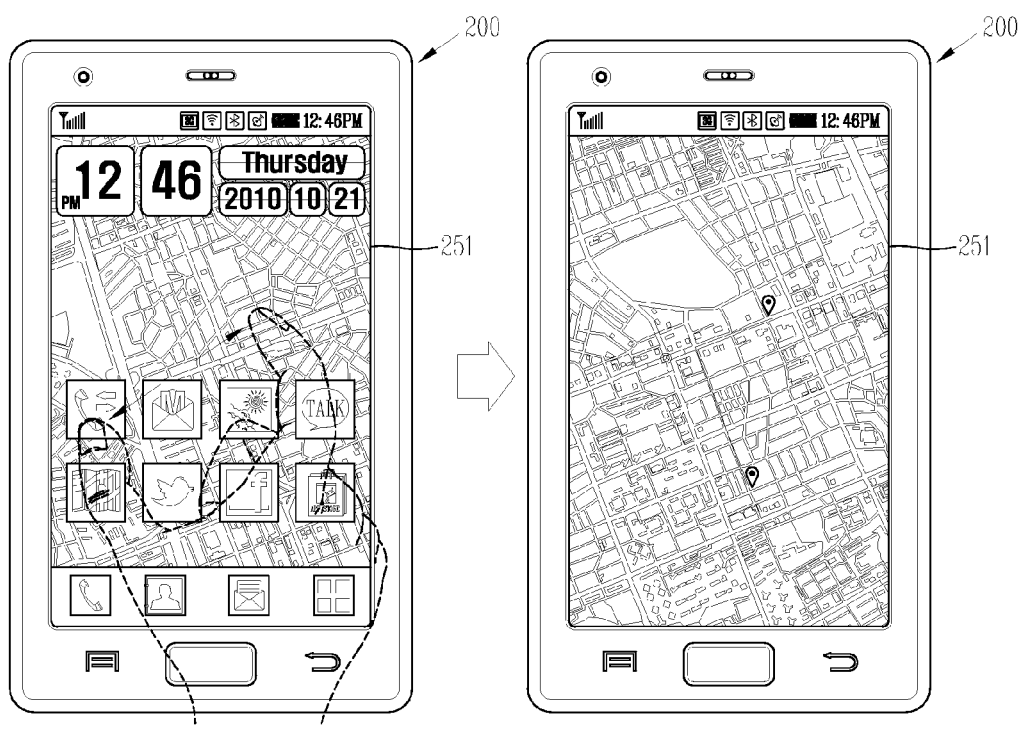

As shown in FIG. 7, an electronic map may be used as a wallpaper of the display unit 251. For example, an electronic map display screen of an application for performing an electronic map function or a corresponding captured screen may be used as the wallpaper.

When objects are displayed on the wallpaper, some portions of the electronic map without being obscured by the objects may be displayed. Here, preferably, a current position of a mobile terminal 200 or a user and neighboring areas of the current position may be displayed. To this end, current time information and position information obtained through GPS or the like may be used.

When the objects disappear from the wallpaper in response to a touch input (e.g., pinch-in gesture) on the display unit 251, the controller may update the content used as the wallpaper, for example, the electronic map based on the current time information and position information.

When the objects disappear, the display unit 251 may also display additional information linked to the wallpaper showing the electronic map. The additional information 252, for example, may include current position information, route information from a departure point to a destination point, traffic condition information, surrounding buildings information and the like.

Figure 8:
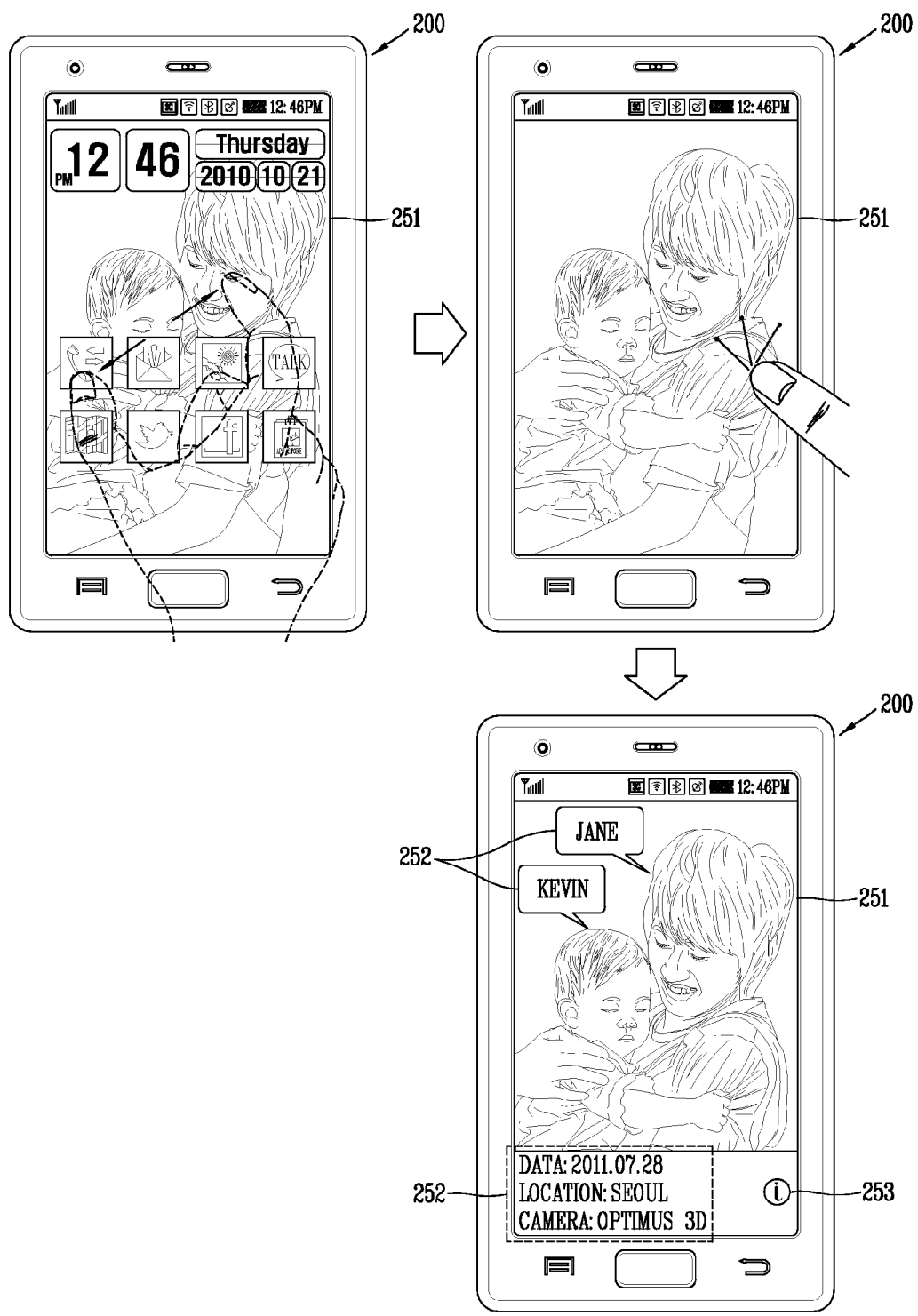
Figure 9:
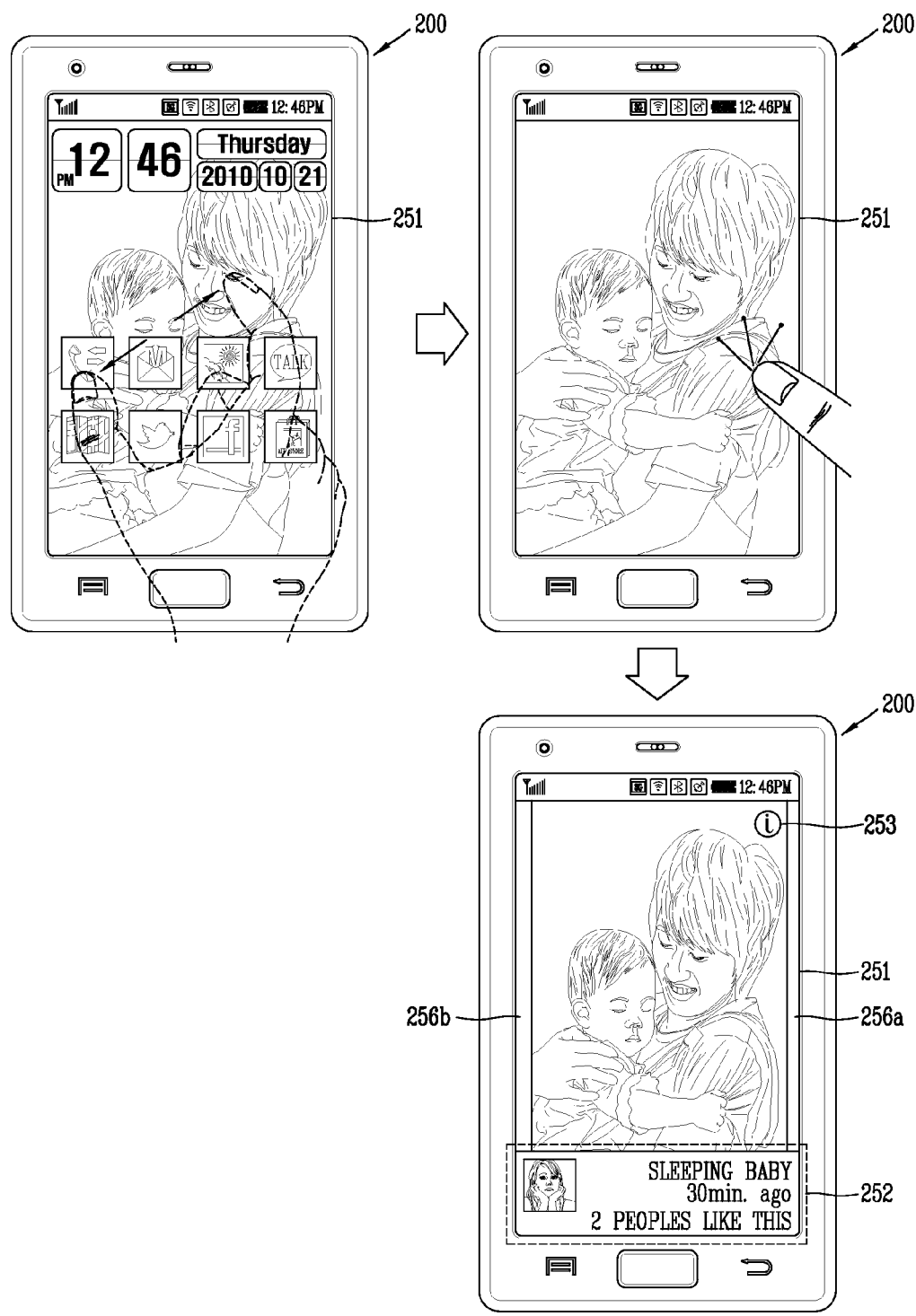

As shown in FIGS. 8 and 9, an image (e.g., family photo) may be used as a wallpaper of the display unit 251. Objects displayed on the wallpaper, may disappear from the wallpaper in response to the pinch-in gesture, as similar to the method shown in FIG. 4. Accordingly, the full image used as the wallpaper can be displayed.

The sensing unit may detect another touch input after the objects disappear. For example, the sensing unit may detect a single touch input. Here, the display unit 251 may display on the wallpaper additional information 252 linked to the wallpaper in response to the another touch input detected after the objects disappear. The controller may control whether to display the additional information 252 in response to repetitive touch inputs. That is, the additional information 252 may appear on or disappear from the wallpaper according to the repetitive touch inputs.

The display unit 251 may display different additional information according to a source of an image used as a wallpaper. For example, when an image is provided from a camera or a memory, as shown in FIG. 8, the display unit 251 may display as the additional information 252 tag information, captured date information, captured place information, captured device information and the like. Here, the display unit 251 may display a shortcut button 253 for executing an application, such as a photo album, for managing images.

As another example, when an image is provided via a Social Network Service (SNS), as shown in FIG. 9, the display unit 251 may display posting information relating to the image recorded in an SNS server as the additional information 252. Here, the display unit 251 may display a shortcut button 253 for accessing the SNS server to execute an application for managing contents transmitted from the SNS server.

Also, in order to indicate that other images 256a and 256b have been posted in the SNS server, the display unit 251 may display parts of the other images 256a and 256b on both sides of an image used as a wallpaper. In this state, when a flicking gesture or a dragging gesture is detected as a touch input on the display unit 251, the controller may perform a turn-over operation with respect to the images posted in the SNS server.

Figure 10:
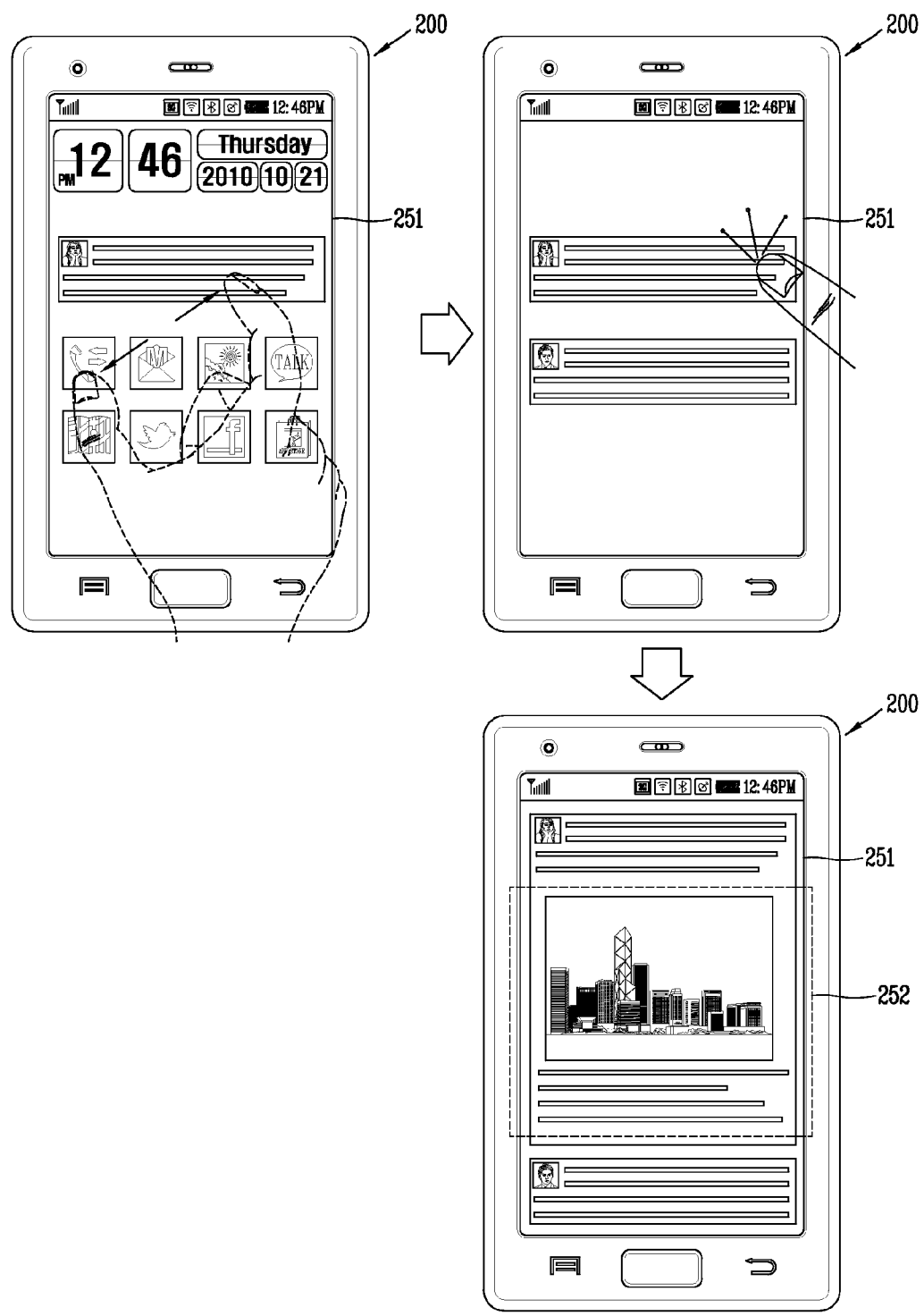

As shown in FIG. 10, contents provided in the SNS server (hereinafter, referred to as 'SNS contents') may be used as a wallpaper of the display unit 251. Although not shown, the SNS contents may be displayed in a Really Simple Syndication or Rich Site Summary (RSS) format. In other words, when objects are displayed on the wallpaper, summary information relating to the SNS contents, such as title, headline and the like, may be displayed.

The objects displayed on the wallpaper may disappear from the wallpaper in response to the pinch-in gesture, as similar to the method shown in FIG. 4. Accordingly, the summary information relating to the SNS contents used as the wallpaper may be fully displayed.

Hereinafter, although not shown, an example of additional information decided according to other wallpapers will be described.

When a terminal system setting screen is used as a wallpaper, additional information linked to the wallpaper may include battery remainder (useable time), memory remainder, application download condition and the like.

When a time information setting screen is used as a wallpaper, additional information linked to the wallpaper may include current time information, area time information (time information on each country), alarm time information and the like.

A character of a game application may be used as a wallpaper. Here, the game application may provide a simulation game for raising a character. Here, additional information linked to the wallpaper may include information related to a raised state of the character.

Meanwhile, a lately terminated screen of a game application may be used as a wallpaper. When objects on a wallpaper corresponding to the lately terminated screen disappear in response to a touch input (e.g., pinch-in gesture) on the display unit, the controller may execute the game application. The game may be started from the lately terminated screen, in response to the execution of the game application.

When an avatar of a health care application is used as a wallpaper, additional information linked to the wallpaper may include personal health information, for example, personal biorhythm information, Body Mass Index (BMI) information, daily momentum information obtained from an acceleration sensor, and the like.

When a content (English word) managed by an education application is used as a wallpaper, additional information linked to the wallpaper may include detailed information relating to the contents, for example, meaning of an English word, pronunciation, practical use and the like.

When a screen showing constellations is used as a wallpaper, additional information linked to the wallpaper may include constellation information which changes as the mobile terminal moves from the current position.

When a screen showing changes in a shape of the moon is used as a wallpaper, additional information linked to the wallpaper may include daily moon shape information, lunar calendar information and the like.

When a webpage is used as a wallpaper, additional information linked to the wallpaper may include favorites screen information.

Figure 11:
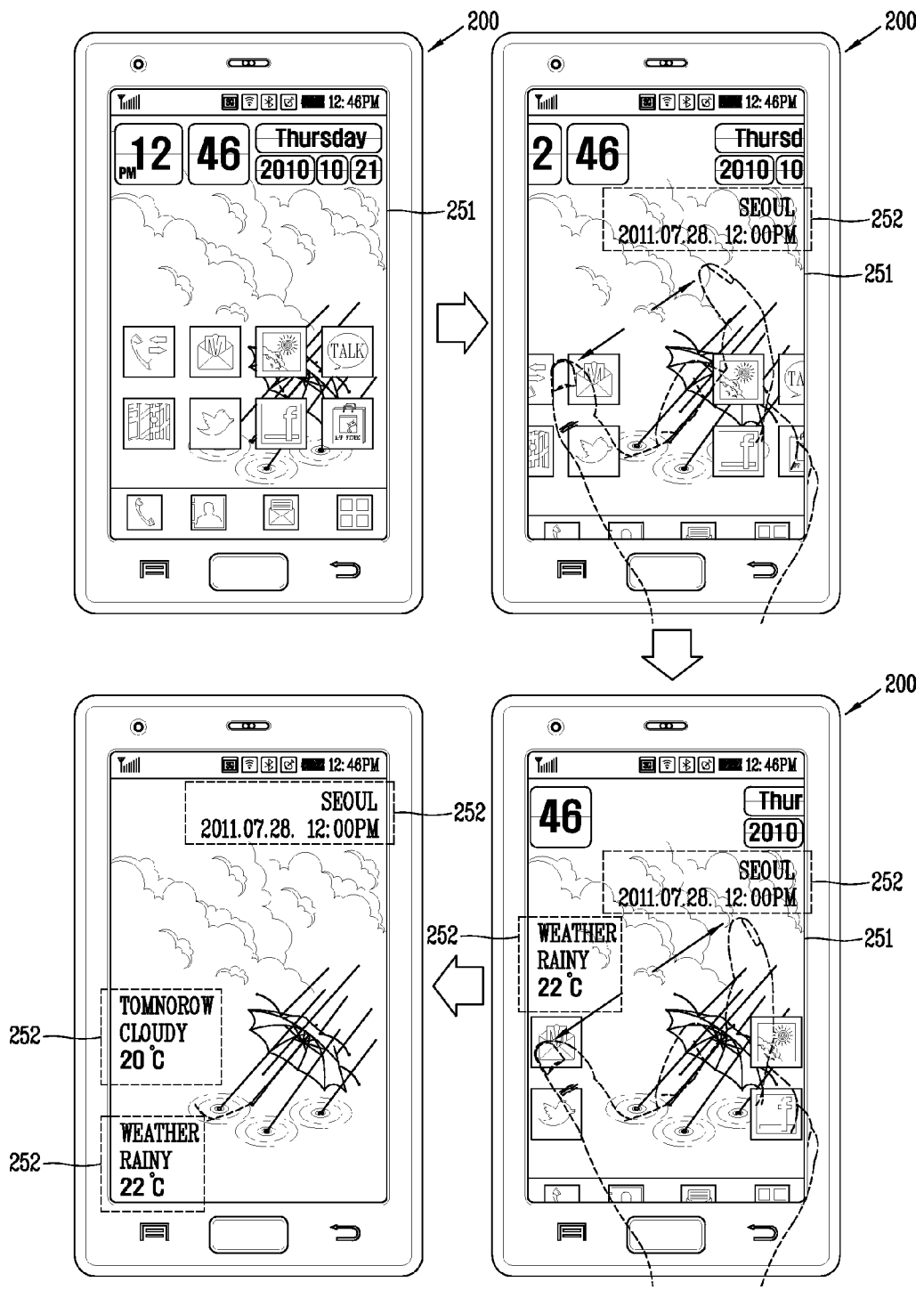

As shown in FIG. 11, when it is detected that first and second touch points as a multi-touch input on the display unit 251 are moved away from each other, that is, when the pinch-in gesture is detected, the controller may move objects on the wallpaper away from the first and second touch points to thusly be invisible.

In more detail, when the pinch-in gesture is detected on a center of the screen of the display unit 251, the controller may move the objects to be farther away from the center of the screen. Here, moved distances of the objects may depend on moved distances of the first and second touch points (a level of two fingers being set apart in the pinch-in gesture). For example, as the moved distances of the first and second touch points increase, the moved distances of the objects may increase.

Afterwards, the objects which are distributed on the entire screen are moved toward edges of the screen, and eventually disappear from the screen area. Here, when the pinch-in gesture is detected in a state that one of the plurality of objects has been selected, the other objects may be moved with the selected object fixed at its current position. Also, the objects may be moved to be gathered at an edge area of the screen (e.g., a blank of the wallpaper).

Meanwhile, a moved distance of each object may depend on a position where the pinch-in gesture is detected on the screen of the display unit 251. For example, when the pinch-in gesture is detected at a position closer to a left edge of the screen than a right edge, a moved distance of an object, which approaches from a position near the detected point toward the right edge of the screen, may be longer than a moved distance of an object, which approaches from a position near the detected position toward the left edge of the screen.

When objects are moved, the display unit 251 may display additional information which changes according to moved distances of the objects on the wallpaper. For example, as shown, as the moved distances of the objects increase, items of additional information displayed on the wallpaper may increase.

The sensing unit may detect a revoke (cancellation) command (return command) while the objects are moved. For example, when the pinch-in gesture is stopped before the objects completely disappear, the revoke command may be detected. More concretely, when the first and second touch points remain still more than a reference time before the objects completely disappear, or when the fingers are taken away from the display unit 251 before the objects completely disappear, the revoke command may be detected.

When the revoke command is detected while the objects are moved, the controller may revoke the movement of the objects and perform an operation of moving the objects back to their original positions. That is, the objects may be moved back to the positions before the pinch-in gesture is detected.

In the exemplary embodiment, although not shown, transparency of each object may change according to a level of the two fingers being set apart in the pinch-in gesture. For example, as the moved distance between the first and second touch points increases more, the objects may become fainter.

A size of each object may change according to the level of the two fingers being set apart in the pinch-in gesture. For example, as the moved distance between the first and second touch points increases more, the objects may become smaller.

Figure 12:
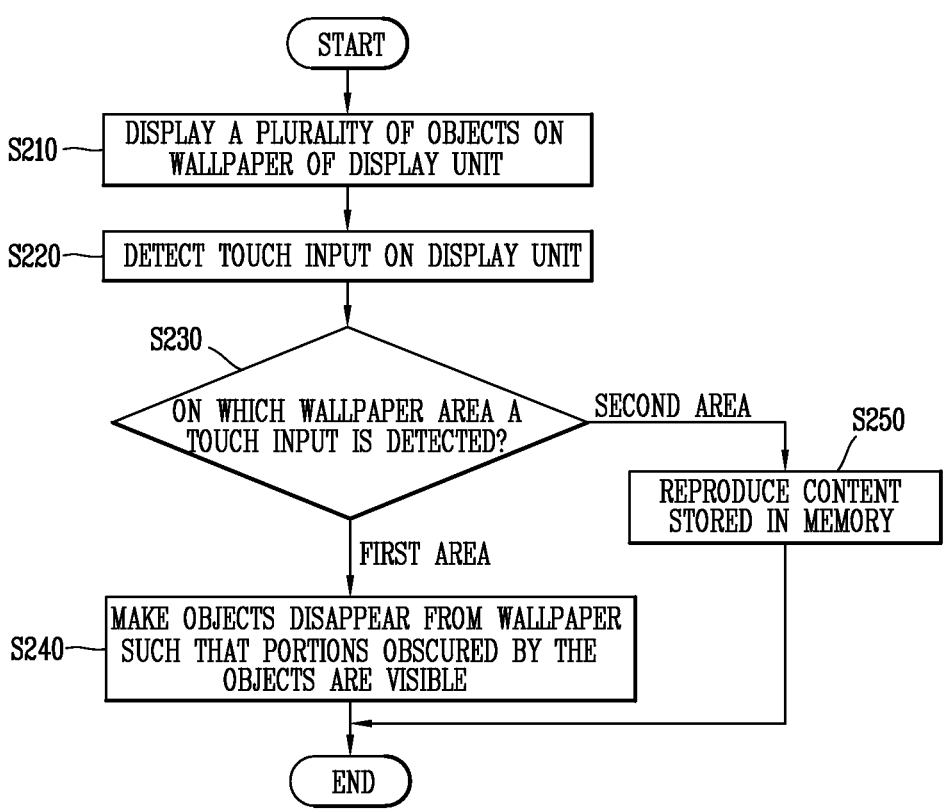
FIG. 12 is a flowchart showing a second exemplary embodiment of a method for providing a user interface in a mobile terminal in accordance with this specification.

FIG. 12 is a flowchart showing a second exemplary embodiment of a method for providing a user interface in a mobile terminal in accordance with this specification. As shown in FIG. 12, similar to the first exemplary embodiment shown in FIG. 3, a method for providing a user interface in a mobile terminal in accordance with a second exemplary embodiment may include displaying a plurality of objects on a wallpaper of a display unit (S210), and detecting a touch input on the display unit in a state that the objects are displayed on the wallpaper (S220).

Next, a step of determining a wallpaper area where the touch input is detected (S230) may be performed. For example, the wallpaper area may separately include first and second areas, and the controller may determine whether the touch input is detected on the first area or the second area.

If it is determined that the touch input is detected on the first area, a step of making the objects invisible such that portions of the wallpaper obscured by the objects are visible (S240) may be performed. On the contrary, if the touch input is detected on the second area, a step of reproducing contents stored in a memory (S250) may be executed. As such, different control operations may be carried out according to the wallpaper area where the touch input is detected.

Figure 13:
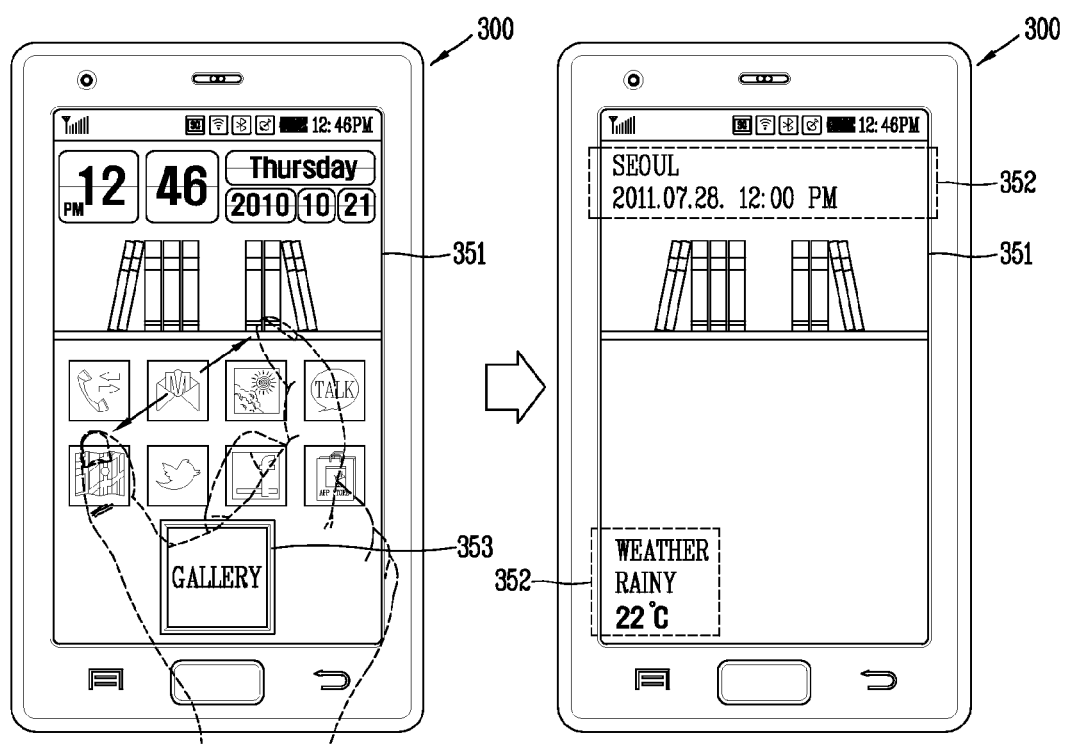
FIGS. 13 and 14 are overviews showing exemplary operations of the mobile terminal according to the user interface providing method of FIG. 12.
Figure 14:
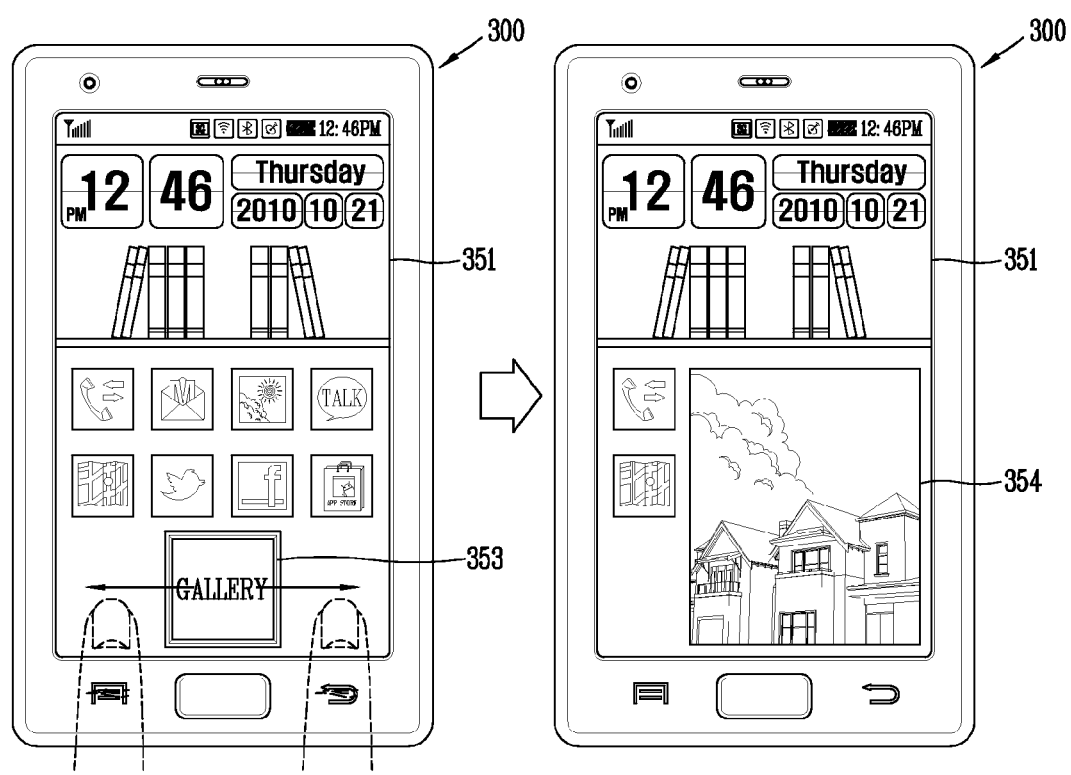

FIGS. 13 and 14 are overviews showing exemplary operations of the mobile terminal according to the user interface providing method of FIG. 12. FIG. 13 shows a user interface when the touch input is detected on the first area, and FIG. 14 shows a user interface when the touch input is detected on the second area.

A display unit 351 may display visual information 353 for dividing a wallpaper into first and second areas. For example, as shown, the display unit 351 may display a frame image as the visual information 353 for dividing the wallpaper into the areas. Here, an area where the frame image is not displayed and an area where the frame image is displayed may correspond to the first and second areas, respectively.

As shown in FIG. 13, the controller may perform an operation of making objects on the wallpaper invisible in response to a touch input (e.g., pinch-in gesture) detected on the first area of the wallpaper. When the objects disappear, the display unit 351 may display additional information 352 linked to the wallpaper on the wallpaper.

As shown in FIG. 14, the controller may reproduce contents stored in a memory in response to a touch input (e.g., pinch-in gesture) detected on the second area of the wallpaper. The display unit 351 may display the reproduced contents, for example, slides of images on a partial area or an entire area of the screen at a predetermined time interval.

Figure 15:
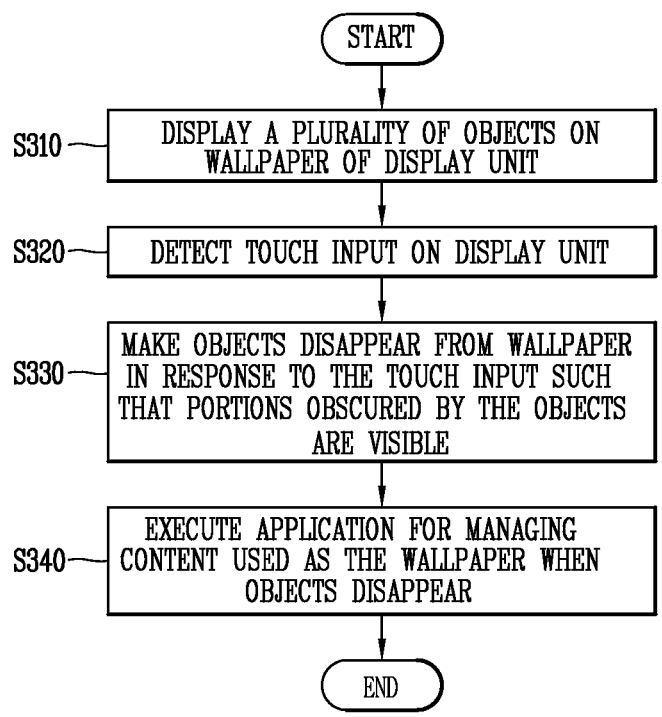
FIG. 15 is a flowchart showing a third exemplary embodiment of a method for providing a user interface in a mobile terminal in accordance with this specification.

FIG. 15 is a flowchart showing a third exemplary embodiment of a method for providing a user interface in a mobile terminal in accordance with this specification. As shown in FIG. 15, similar to the first exemplary embodiment shown in FIG. 3, a method for providing a user interface in a mobile terminal in accordance with a third exemplary embodiment may include displaying a plurality of objects on a wallpaper of a display unit (S310), detecting a touch input on the display unit in a state that the objects are displayed on the wallpaper (S320), and making the objects invisible, in response to the touch input, such that portions obscured by the objects on the wallpaper are visible (S330).

When the objects disappear, a step of executing an application for managing contents used as a wallpaper (S340) may be carried out. Here, different applications may be executed according to contents used as the wallpaper.

FIGS. 16 to 19 are overviews showing exemplary operations of a mobile terminal 400 according to the user interface providing method of FIG. 15.

Figure 16:
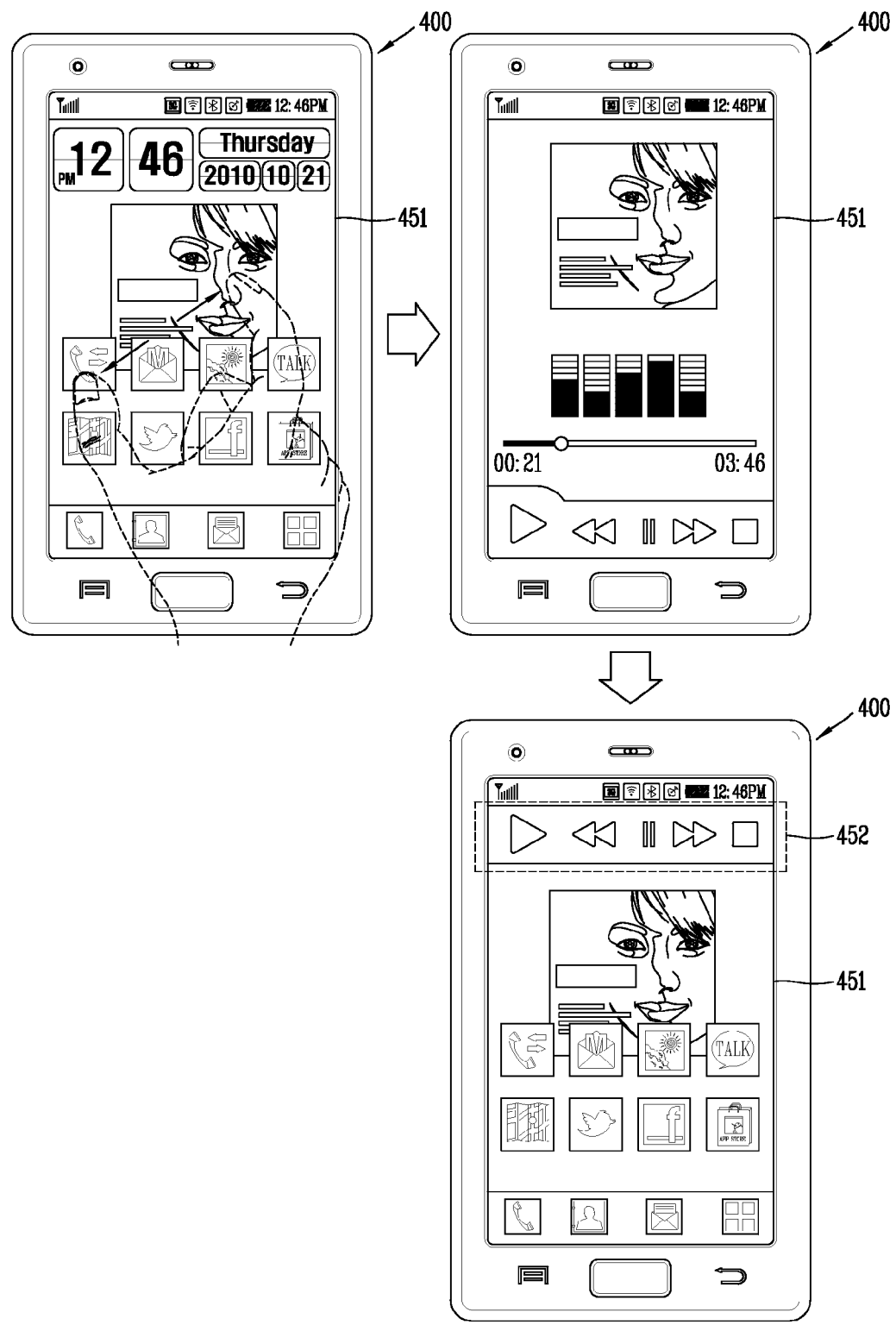
FIGS. 16 to 19 are overviews showing exemplary operations of the mobile terminal according to the user interface providing method of FIG. 15.

As shown in FIG. 16, an album jacket image of a music file (e.g., MP3 file) may be used as a wallpaper of a display unit 451. When objects disappear from the wallpaper in response to a touch input (e.g., pinch-in gesture) on the display unit 451, the controller may display an album jacket image and execute an MP3 player for managing the corresponding music file. The display unit 451 may display an execution screen of the MP3 player.

In the objects-disappeared state, namely, in the state that the execution screen of the MP3 player is displayed, when another touch input (e.g., pinch-out gesture) is detected on the display unit 451, the controller may perform an operation for making the disappeared objects visible on the wallpaper in response to the another touch input. Here, the wallpaper may change into the album jacket image of the music file which is being reproduced by the MP3 player.

When the disappeared objects appear again, the display unit 451 may display a brief control menu 452 for the MP3 player on a partial area of the screen (e.g., a top of the screen). Accordingly, a user may control the MP3 player without entering the execution screen of the MP3 player by virtue of the brief control menu 452.

Figure 17:
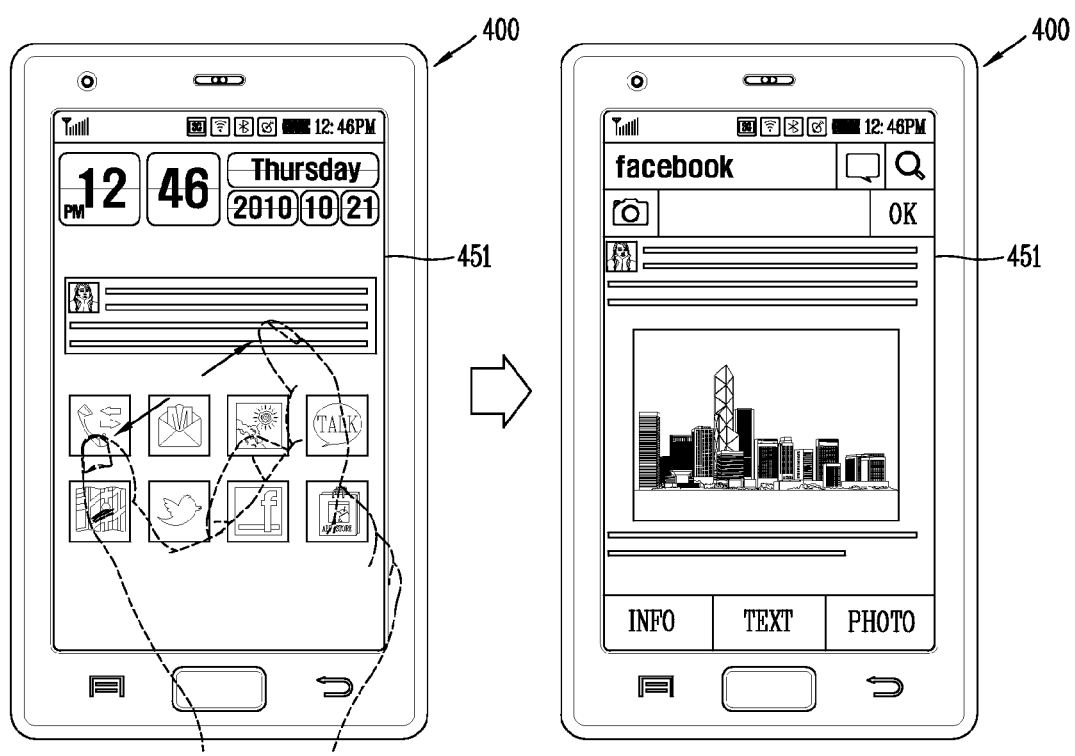

Referring to FIG. 17, as shown in FIG. 10, SNS contents may be used as a wallpaper of the display unit 451. When objects disappear from the wallpaper in response to a touch input (e.g., pinch-in gesture) on the display unit 451, the controller may access an SNS server to execute an application for managing the SNS contents posted in the SNS server (hereinafter, 'SNS application'). The display unit 451 may display an execution screen for the SNS application.

In the objects-disappeared state, namely, in the state that the execution screen for the SNS application is displayed, when a touch input (e.g., pinch-out gesture) is detected on the display unit 451, the controller may perform an operation of making the disappeared objects visible again on the wallpaper in response to another touch input. Here, the wallpaper may change into the lately checked SNS contents by the SNS application.

Figure 18:
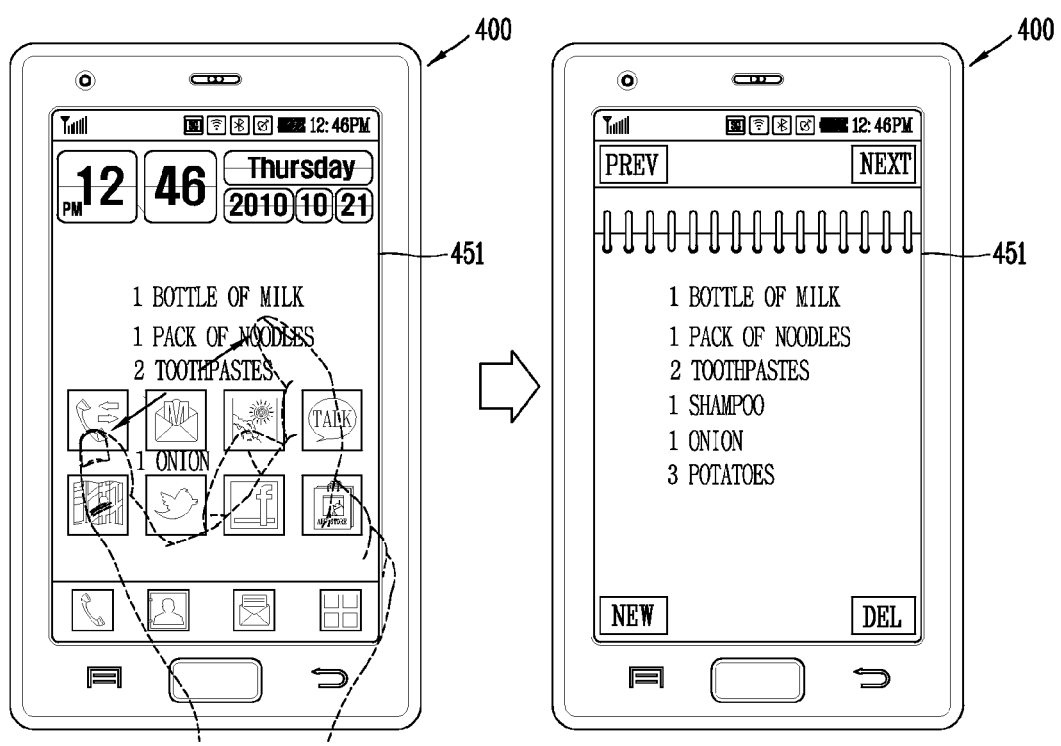

As shown in FIG. 18, a page of a memo pad may be used as a wallpaper of the display unit 451. When the objects disappear from the wallpaper in response to a touch input (e.g., pinch-in gesture) on the display unit 451, the controller may execute an application for performing the memo pad function (hereinafter, referred to as 'memo pad editor'). The display unit 41 may display an execution screen of the memo pad editor.

In the objects-disappeared state, namely, in the state that the execution screen for the memo pad editor is displayed, when another touch input (e.g., pinch-out gesture) is detected on the display unit 451, the controller may perform an operation of making the disappeared objects visible again on the wallpaper in response to the another touch input. Here, the wallpaper may change into a page of the memo pad which has been lately edited by the memo pad editor.

Figure 19:
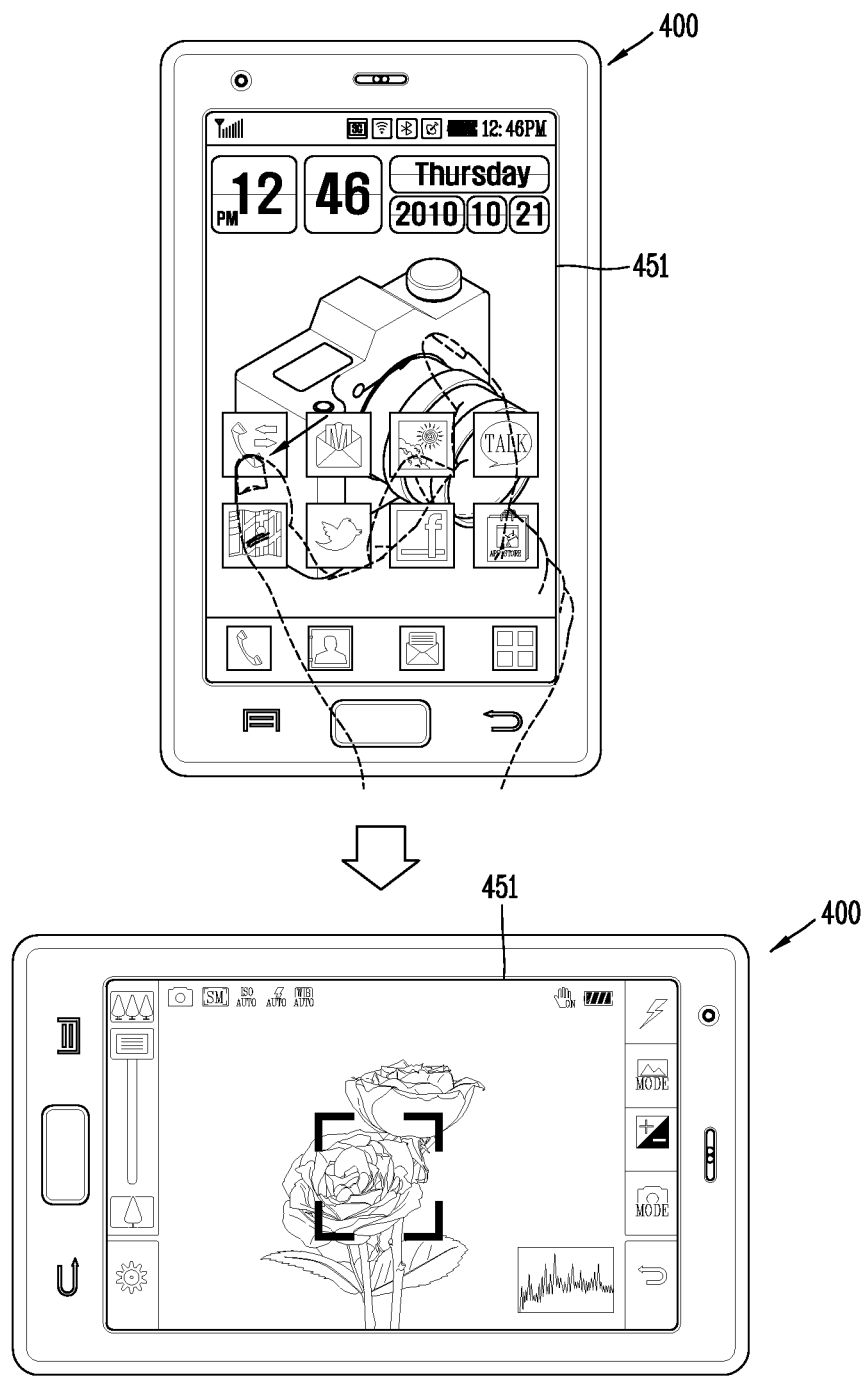

As shown in FIG. 19, an icon of an application may be used as a wallpaper of the display unit 451. For example, as shown, an icon of an application for controlling a capturing device such as a camera (hereinafter, 'capturing application') may be used as the wallpaper.

When the objects disappear from the wallpaper in response to a touch input (e.g., pinch-in gesture) on the display unit 451, the controller may execute the capturing application. The display unit 451 may display an execution screen for the capturing application. For example, the execution screen for the capturing application may include a preview screen for a scene being captured by the capturing device.

In the objects-disappeared state, namely, in the state that the execution screen for the capturing application is displayed, when another touch input (e.g., pinch-out gesture) is detected on the display unit 451, the controller may perform an operation of making the disappeared objects visible again on the wallpaper in response to the another touch input on the display unit 451.

As aforementioned, according to the user interfaces of the present disclosure, a user can simply use the MP3 player, the SNS application, the memo pad editor, the capturing application and the like right after the objects temporarily disappear from the wallpaper in response to a touch input on the display unit 451.

Figure 20:
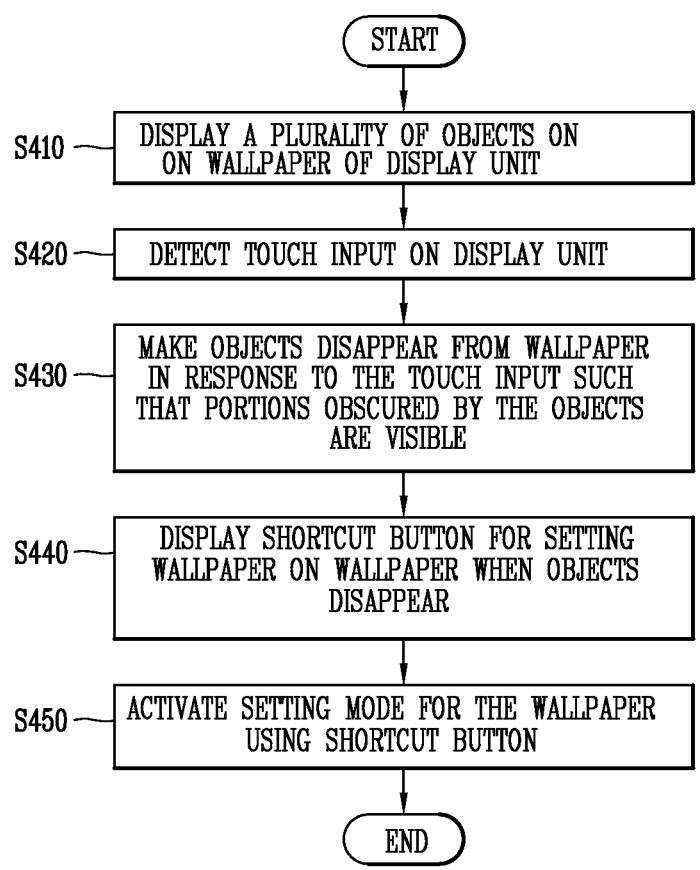
FIG. 20 is a flowchart showing a fourth exemplary embodiment of a method for providing a user interface in a mobile terminal in accordance with this specification.

FIG. 20 is a flowchart showing a fourth exemplary embodiment of a method for providing a user interface in a mobile terminal in accordance with this specification. As shown in FIG. 20, similar to the first exemplary embodiment shown in FIG. 3, a method for providing a user interface in a mobile terminal in accordance with a fourth exemplary embodiment may include displaying a plurality of objects on a wallpaper of a display unit (S410), detecting a touch input on the display unit in a state that the objects are displayed on the wallpaper (S420), and making the objects invisible, in response to the touch input, such that portions obscured by the objects on the wallpaper are visible (S430).

When the objects disappear, a shortcut button for setting a wallpaper may be displayed on the wallpaper (S440). Afterwards, the shortcut button may be used to execute a setting mode for the wallpaper (S450). In such setting mode, contents used as the wallpaper may be changed or edited by a user input.

Figure 21:
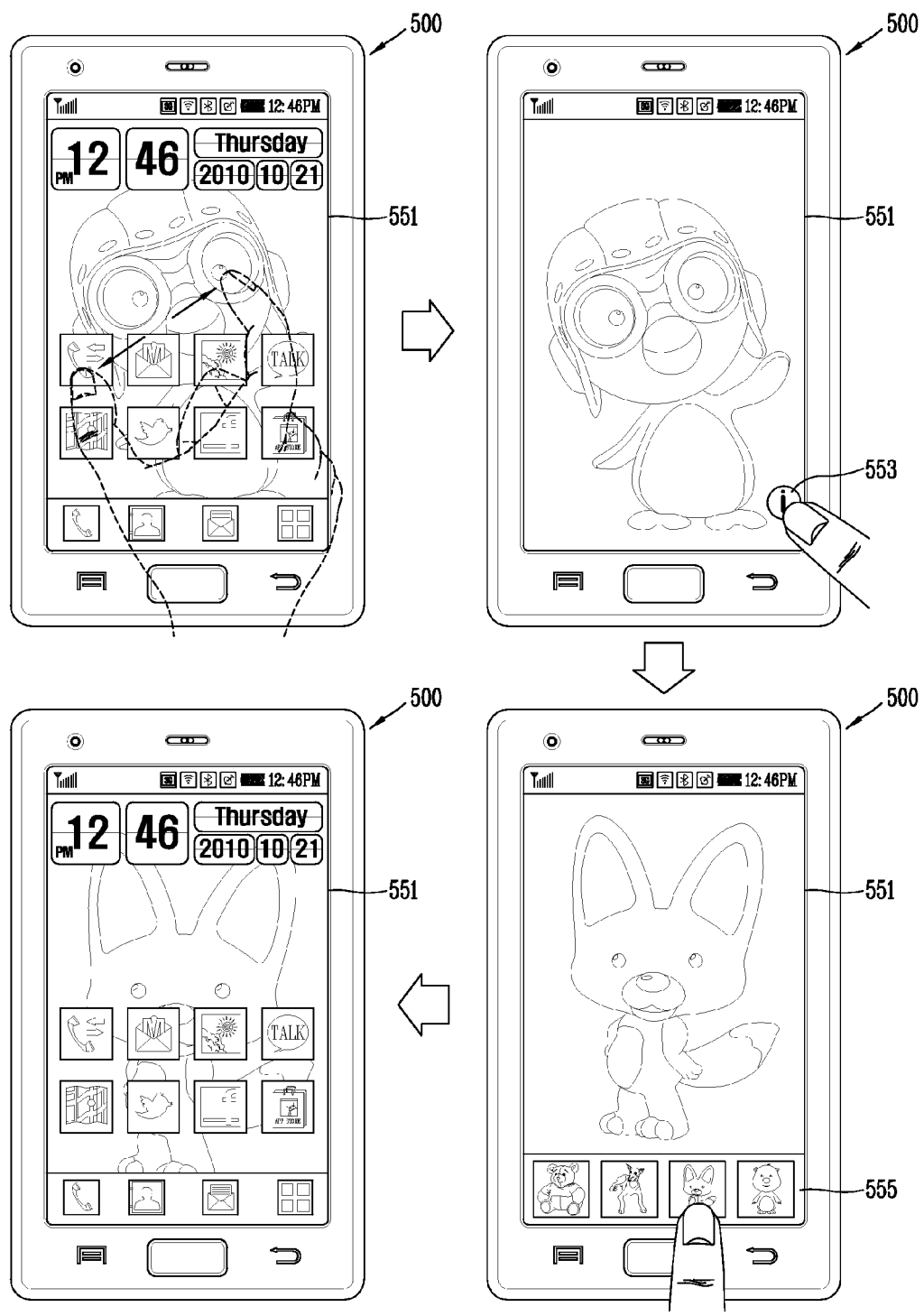
FIGS. 21 and 22 are overviews showing exemplary operations of the mobile terminal according to the user interface providing method of FIG. 20.
Figure 22:
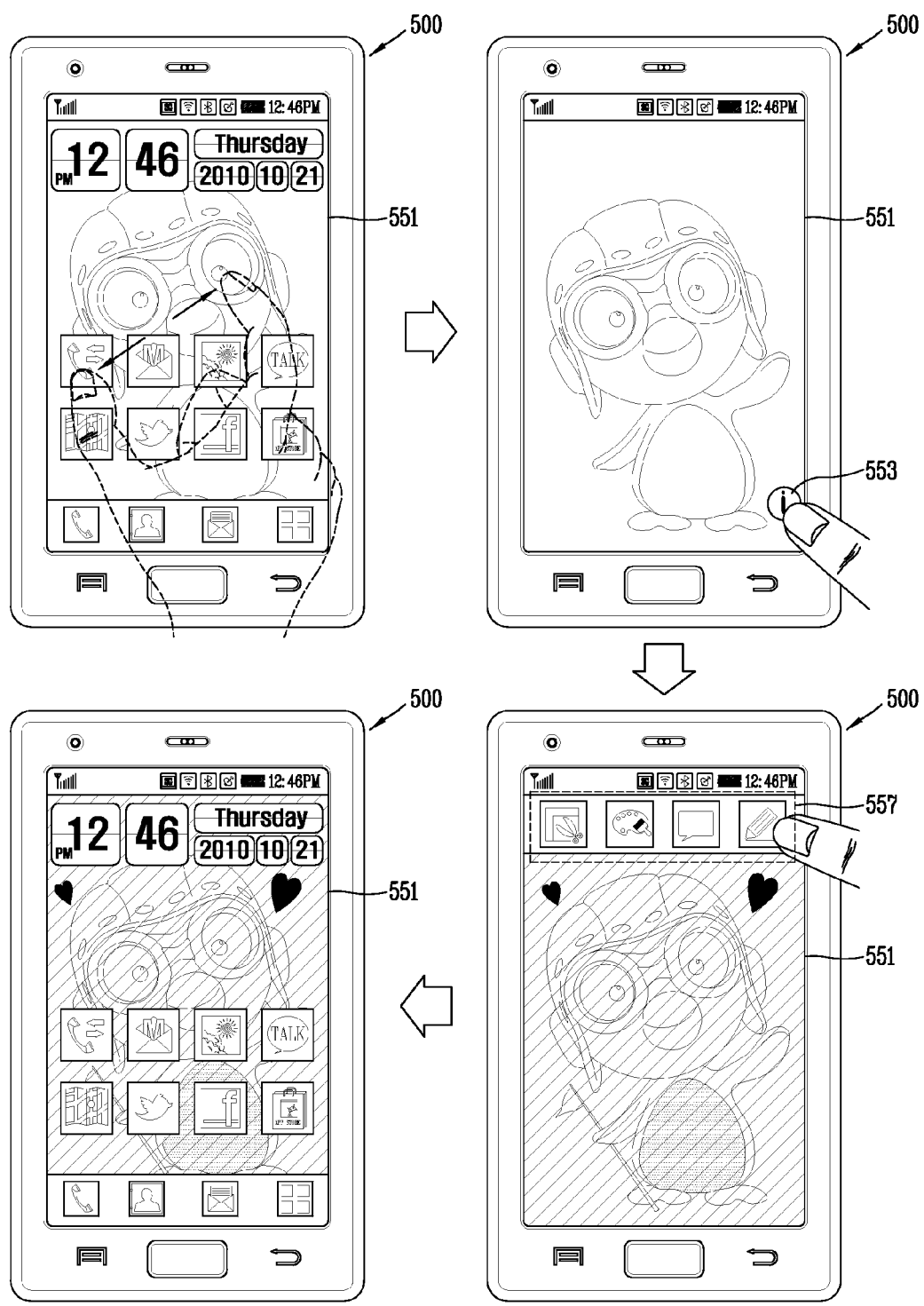

FIGS. 21 and 22 are overviews showing exemplary operations of the mobile terminal according to the user interface providing method of FIG. 20. FIG. 21 shows a user interface for changing contents used as a wallpaper, and FIG. 22 shows a user interface for editing contents used as a wallpaper. Hereinafter, repetitive description for the aforementioned will be omitted.

When objects disappear from the wallpaper in response to a touch input (e.g., pinch-in gesture) on a display unit 551, the display unit 551 may display a shortcut button 553 for setting a wallpaper in form of an icon on the wallpaper. When a touch input is detected on the shortcut button 553, the controller may activate a setting mode for setting the wallpaper.

When the setting mode is activated, as shown in FIG. 21, the display unit 551 may display contents candidates 555 to be used as the wallpaper in form of a thumbnail image. When a selection of one of the contents candidates 555 is detected, the selected content may be used as the wallpaper.

When the setting mode is activated, as shown in FIG. 22, the display unit 551 may display a tool menu 557 for editing the wallpaper on a partial area of the screen. The tool menu 557 may include buttons for executing several functions, such as text insertion, drawing, sticker addition, filter effect and the like. When the filter effect is applied to a content using the tool menu 557, the filter effect-applied content may be used as a wallpaper.

As aforementioned, in the state that the wallpaper has been set or changed, when another touch input (e.g., pinch-out gesture) is detected on the display unit 551, the controller may perform an operation of making the disappeared objects visible on the newly set wallpaper in response to the another touch input.

Hereinafter, although not shown, a setting mode which is defined according to other wallpaper screens will be described.

When a screen for informing the weather is used as a wallpaper, a user interface may provide a menu screen for setting time information, position information and the like for obtaining weather information in the setting mode.

When an SNS content is used as a wallpaper, a user interface may provide a menu screen for setting address information, search information and the like for an SNS server in the setting mode.

When a live wallpaper is used as a wallpaper, a user interface may provide a menu screen for setting source images included in the live wallpaper and a time interval for displaying the source images in a sliding manner in the setting mode.

Figure 23:
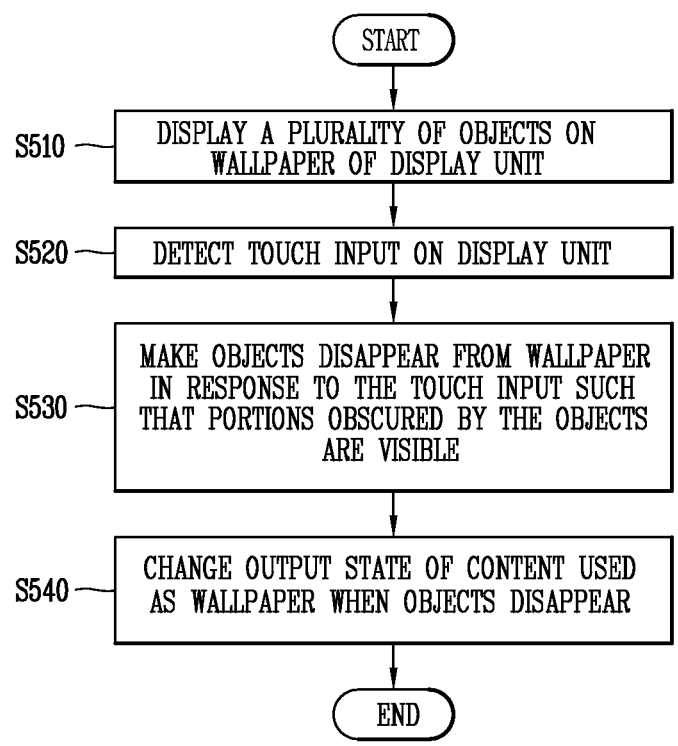
FIG. 23 is a flowchart showing a fifth exemplary embodiment of a method for providing a user interface in a mobile terminal in accordance with this specification.

FIG. 23 is a flowchart showing a fifth exemplary embodiment of a method for providing a user interface in a mobile terminal in accordance with this specification. As shown in FIG. 23, similar to the first exemplary embodiment shown in FIG. 3, a method for providing a user interface in a mobile terminal in accordance with a fifth exemplary embodiment may include displaying a plurality of objects on a wallpaper of a display unit (S510), detecting a touch input on the display unit in a state that the objects are displayed on the wallpaper (S520), and making the objects invisible, in response to the touch input, such that portions obscured by the objects on the wallpaper are visible (S530).

When the objects disappear, a step of changing an output state of a content used as the wallpaper (S540) may be executed. For example, when the objects disappear, an animation effect, a sound effect, a 3D effect and the like may be activated for the content used as the wallpaper. As another example, in a state that the wallpaper is displayed in a power saving mode before the objects disappear, when the objects disappear, the power saving mode may be released.

Figure 24:
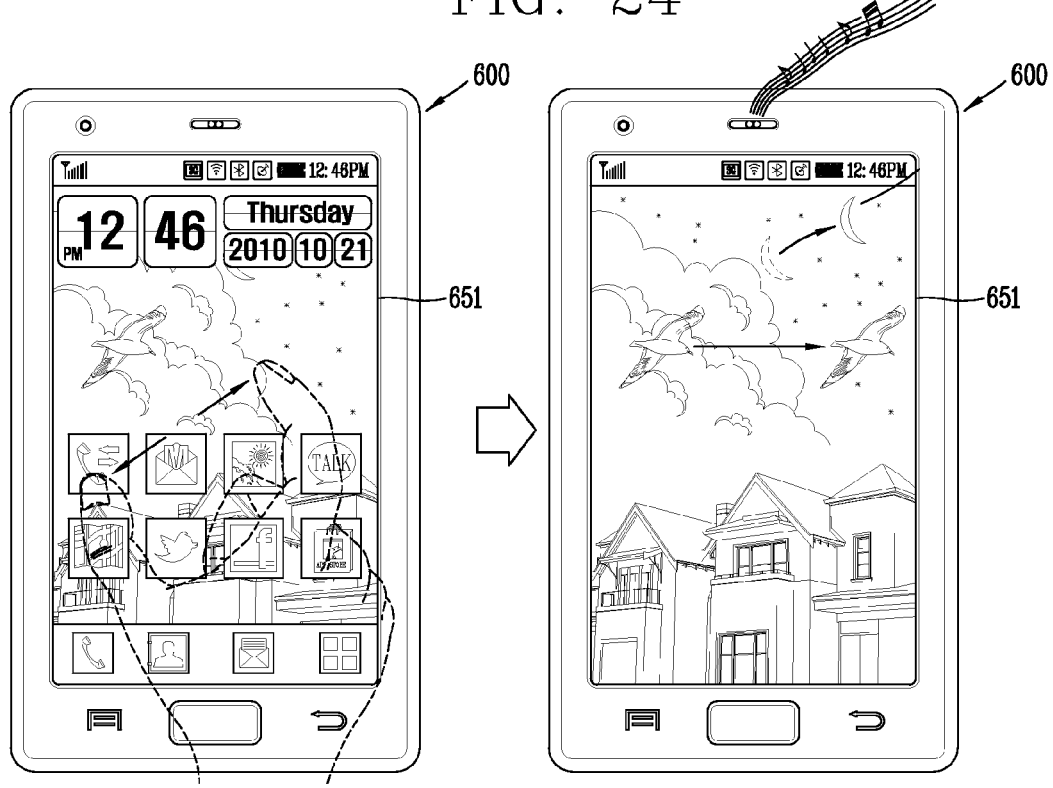
FIG. 24 is an overview showing exemplary operations of the mobile terminal according to the user interface providing method of FIG. 23.

FIG. 24 is an overview showing exemplary operations of the mobile terminal according to the user interface providing method of FIG. 23. As shown in FIG. 24, when objects disappear from a wallpaper in response to a touch input (e.g., pinch-in gesture) on a display unit 651, an animation effect, a sound effect, a 3D effect and the like may be activated for the content used as the wallpaper.

For example, the display unit 651 may display content elements which start to move from a suspended state (e.g., flying bird, rotating moon, etc.) or content elements which move faster than before. Also, an audio output module (not shown) may output a sound set to a content.

Figure 25:
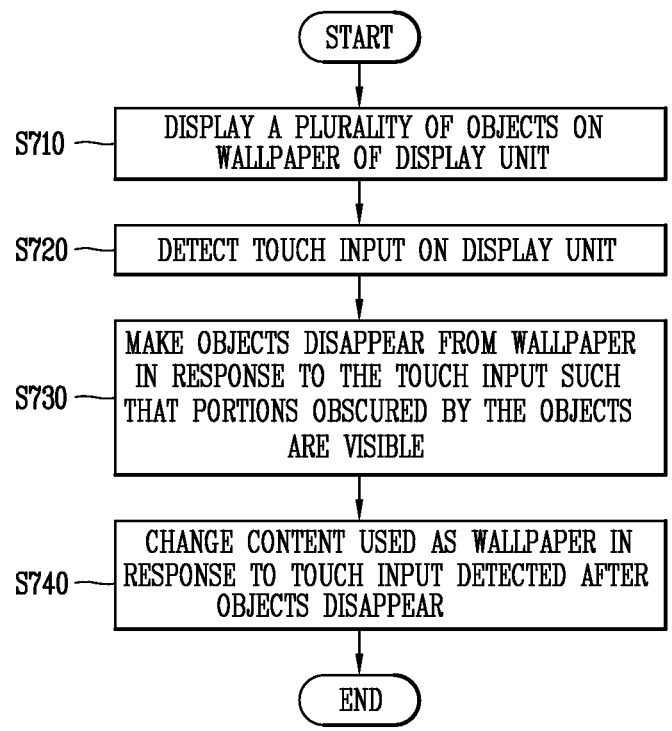
FIG. 25 is a flowchart showing a sixth exemplary embodiment of a method for providing a user interface in a mobile terminal in accordance with this specification.

FIG. 25 is a flowchart showing a sixth exemplary embodiment of a method for providing a user interface in a mobile terminal in accordance with this specification. As shown in FIG. 25, similar to the first exemplary embodiment shown in FIG. 3, a method for providing a user interface in a mobile terminal in accordance with a sixth exemplary embodiment may include displaying a plurality of objects on a wallpaper of a display unit (S610), detecting a touch input on the display unit in a state that the objects are displayed on the wallpaper (S620), and making the objects invisible, in response to the touch input, such that portions obscured by the objects on the wallpaper are visible (S630).

When the objects disappear, a sensor for detecting an input for controlling a content used as the wallpaper may be activated (S640). Here, the sensor may include a voice recognition sensor, a face recognition sensor and the like.

Figure 26:
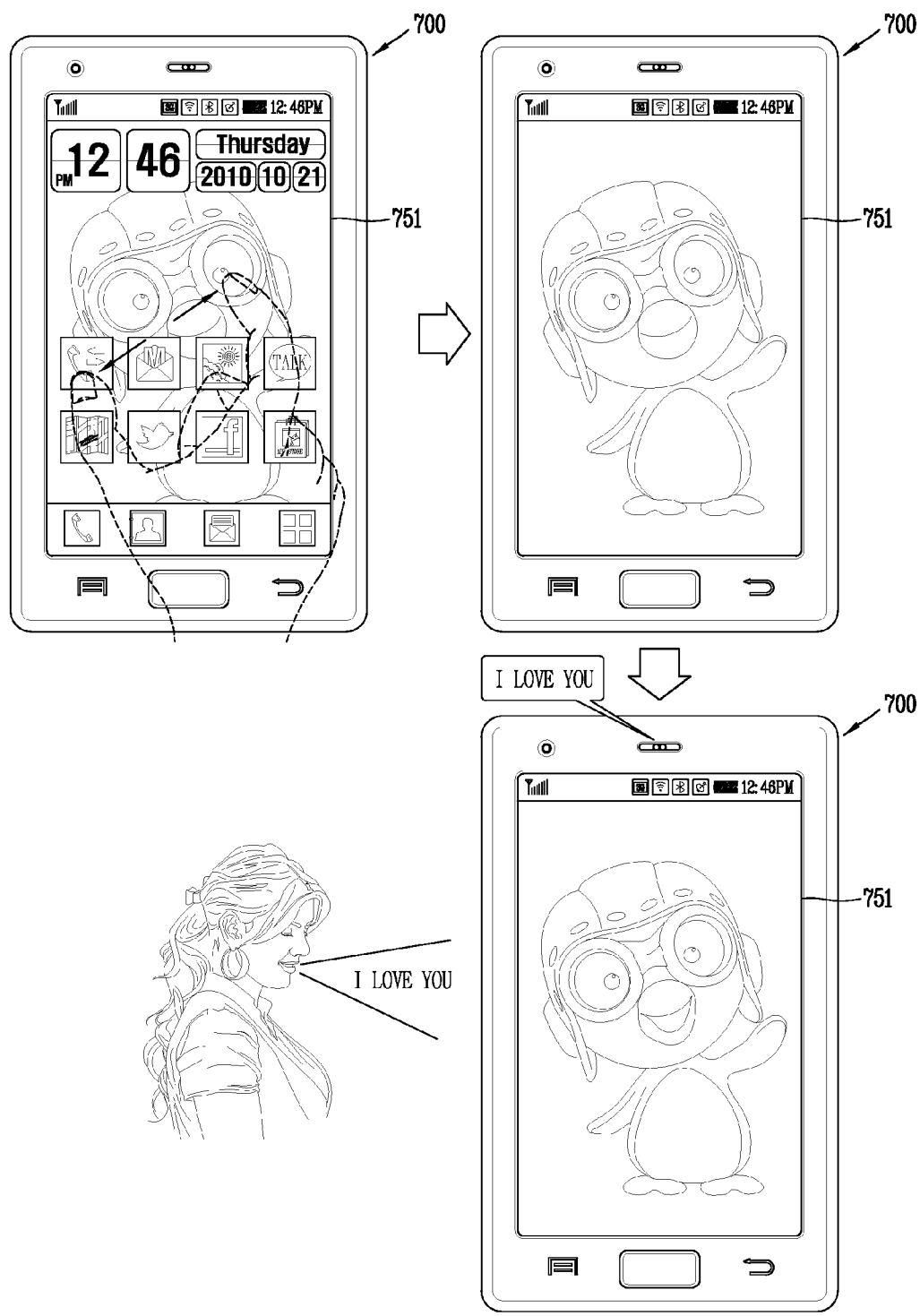
FIGS. 26 and 27 are overviews showing exemplary operations of the mobile terminal according to the user interface providing method of FIG. 25.
Figure 27:
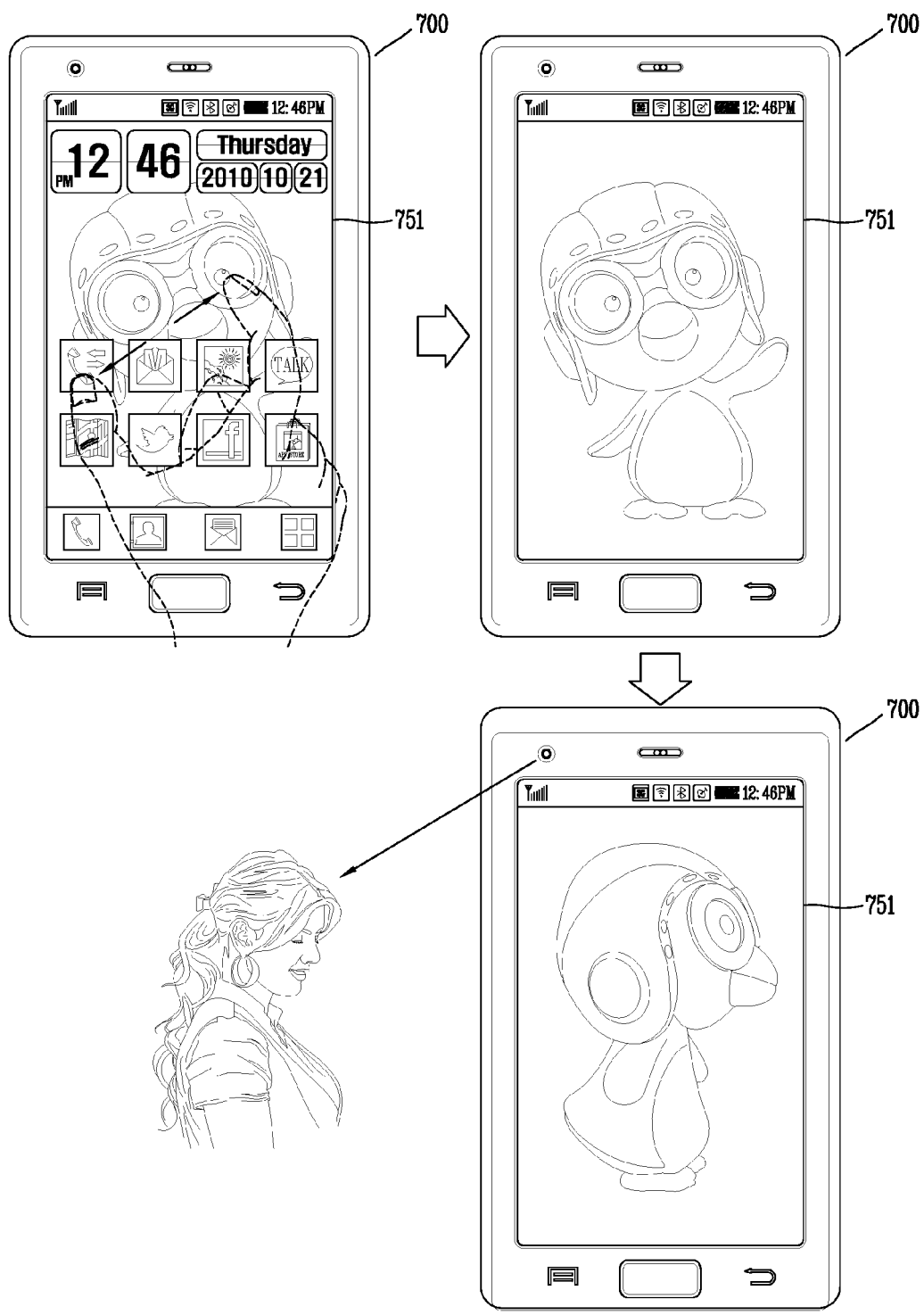

FIGS. 26 and 27 are overviews showing exemplary operations of a mobile terminal 700 according to the user interface providing method of FIG. 25. As shown in FIGS. 26 and 27, a character reacting with an input detected by a sensor (not shown) may be used as a wallpaper of a display unit 700.

When objects disappear from the wallpaper in response to a touch input (e.g., pinch-in gesture) on the display unit 751, the sensor such as the voice recognition sensor, the face recognition sensor and the like may be activated.

When a user's voice is detected by the voice recognition sensor, as shown in FIG. 26, the controller may control a character to respond to the detected voice. For example, the character may act to open a mouth in response to the detected voice. Here, the detected voice may be stored in a memory.

When a user's facial image is detected by the face recognition sensor, as shown in FIG. 26, the controller may control the character to respond to the detected image. For example, when a user's profile is detected from the image, the controller may control the character to show the profile. Here, the detected image may be stored in the memory.

Figure 28:
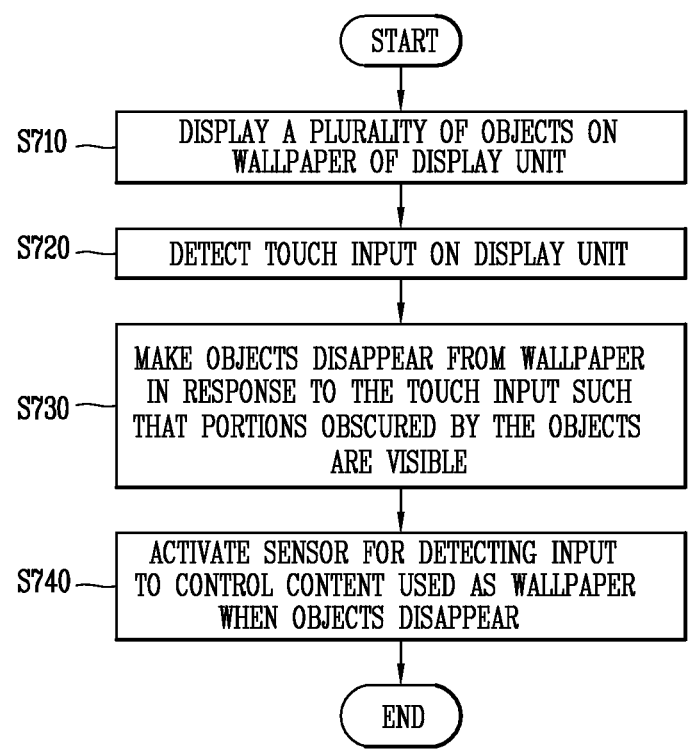
FIG. 28 is a flowchart showing a seventh exemplary embodiment of a method for providing a user interface in a mobile terminal in accordance with this specification.

FIG. 28 is a flowchart showing a seventh exemplary embodiment of a method for providing a user interface in a mobile terminal in accordance with this specification. As shown in FIG. 28, similar to the first exemplary embodiment shown in FIG. 3, a method for providing a user interface in a mobile terminal in accordance with a seventh exemplary embodiment may include displaying a plurality of objects on a wallpaper of a display unit (S710), detecting a touch input on the display unit in a state that the objects are displayed on the wallpaper (S720), and making the objects invisible, in response to the touch input, such that portions obscured by the objects on the wallpaper are visible (S730).

When another touch input is detected on the display unit after the objects disappear, a content used as a wallpaper may be changed in response to the another touch input (S740). Hereinafter, description will be given in more detail of a method for changing a content used as a wallpaper in response to another touch input with reference to the accompanying drawings.

Figure 29:
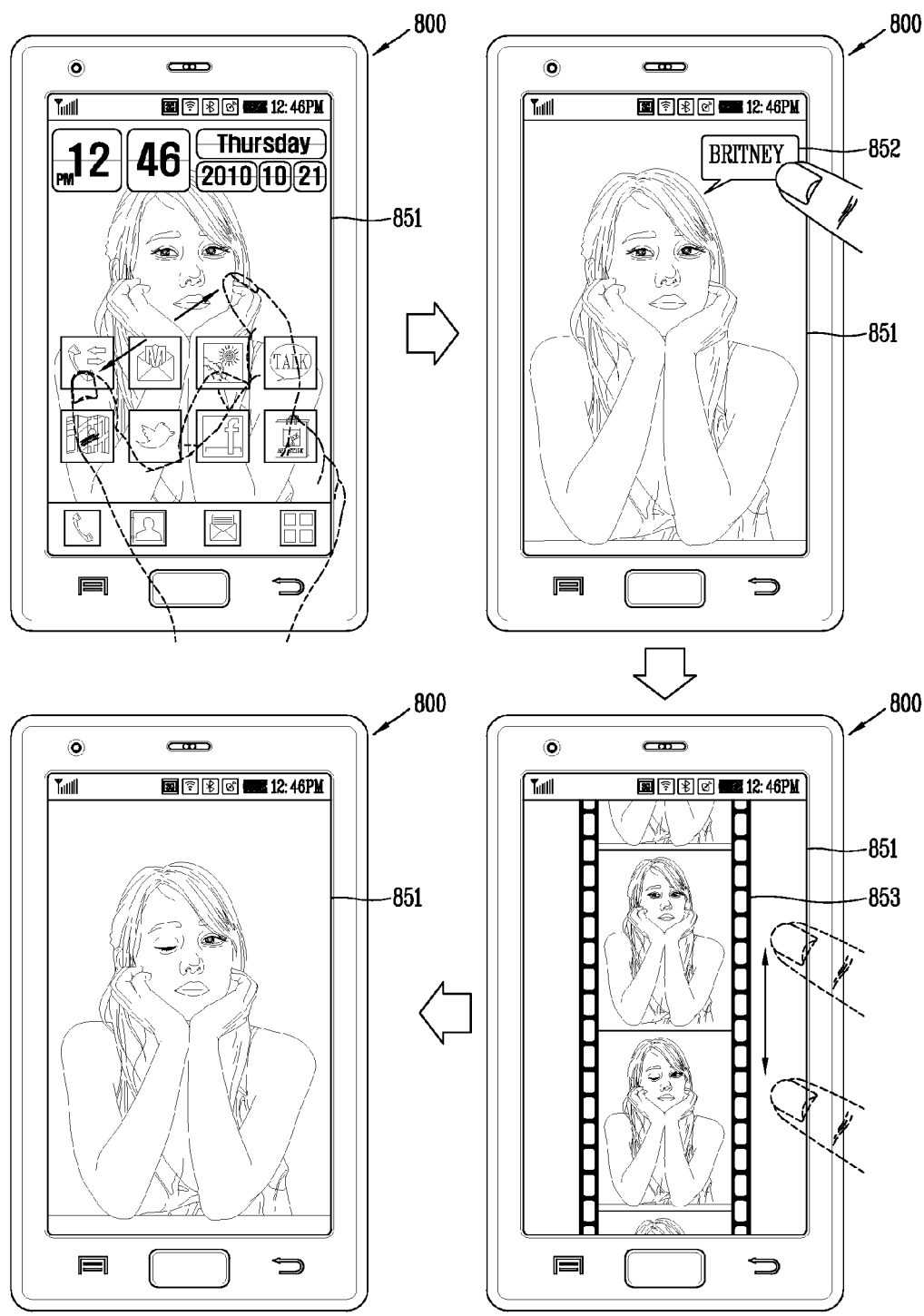
FIGS. 29 and 30 are overviews showing exemplary operations of the mobile terminal according to the user interface providing method of FIG. 28.
Figure 30:
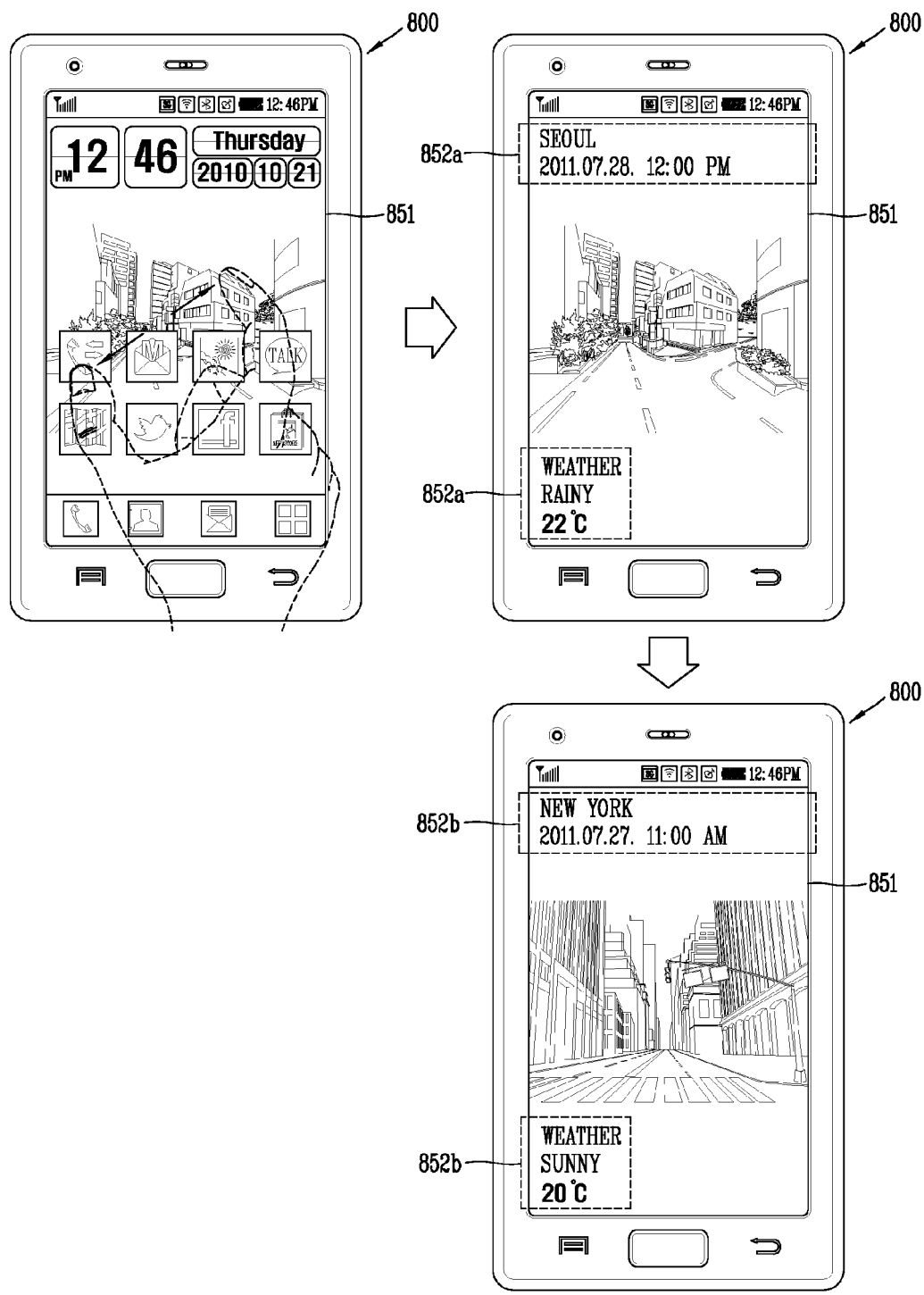

FIGS. 29 and 30 are overviews showing exemplary operations of a mobile terminal 800 according to the user interface providing method of FIG. 28. An image, as aforementioned, may be used as a wallpaper of a display unit 851. For example, as shown in FIG. 29, a portrait may be used as a wallpaper. Also, as shown in FIG. 30, a landscape image may be used as a wallpaper.

As shown in FIG. 29, when objects disappear from a wallpaper in response to a touch input (e.g., pinch-in gesture) on the display unit 851, the display unit 851 may display tag information 852 related to an image used as a wallpaper.

When selection for the tag information 852 is detected, the display unit 851 may display images 853 sharing the tag information 852 in form of a thumbnail image. Afterwards, when another touch input (e.g., longitudinal dragging gesture) is detected on the display unit 851, the controller may scroll the images 853 sharing the tag information 852 in response to the another touch input. When one of the image 853 displayed on the screen area is selected after scrolled, the selected image may be used as the wallpaper.

As shown in FIG. 30, when objects disappear from the wallpaper in response to a touch input (e.g., pinch-in gesture) on the display unit 851, the display unit 851 may display additional information 852*a* linked to the wallpaper.

Afterwards, when another touch input (e.g., horizontal flicking gesture) is detected on the display unit 851, the controller may perform an operation of turning the images over in response to the another touch input. In other words, the current image may change into another image (e.g., landscape image of New York). Also, the current additional information 852*a* may change into additional information 852*b* corresponding to the another image.

Figure 31:
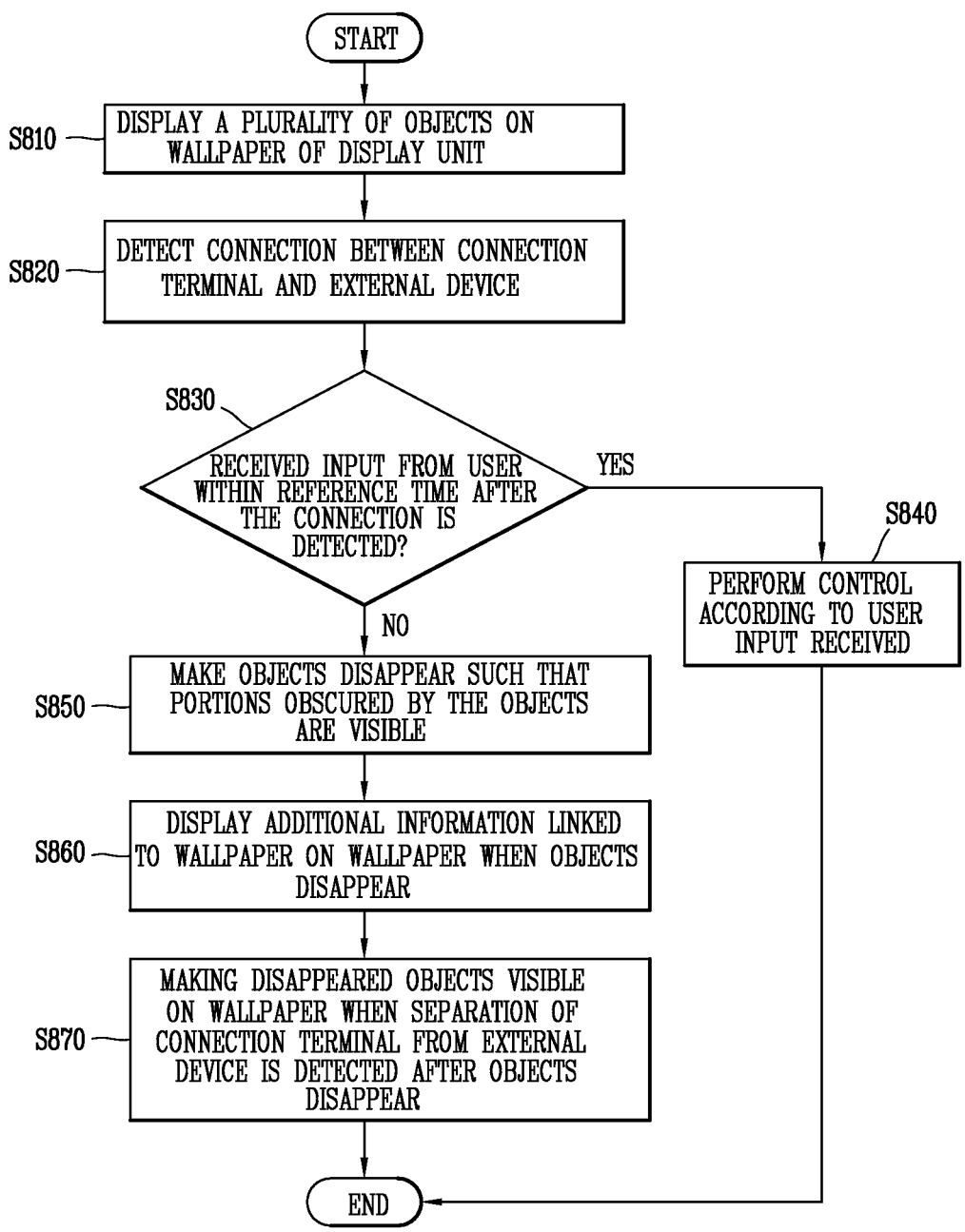
FIG. 31 is a flowchart showing an eighth exemplary embodiment of a method for providing a user interface in a mobile terminal in accordance with this specification.

FIG. 31 is a flowchart showing an eighth exemplary embodiment of a method for providing a user interface in a mobile terminal in accordance with this specification. As shown in FIG. 31, a method for providing a user interface in a mobile terminal in accordance with an eighth exemplary embodiment may include displaying a plurality of objects on a wallpaper of a display unit (S810).

Afterwards, a connection between a connection terminal and an external device may be detected (S820). Here, the connection terminal may be one component of the interface unit 170 (see FIG. 1), and allow for exchange of signals and power with the external device.

It may be then determined whether a user input is received within a preset reference time after detecting the connection between the connection terminal and the external device (S830). If it is determined that the user input is received within the reference time, a control operation may be performed according to the user input received (S840). If it is determined that the user input is not received within the reference time, the objects may be made invisible such that portions of the wallpaper obscured by the objects are visible (S850).

When the objects disappear, additional information linked to the wallpaper may be displayed on the wallpaper (S860). Also, when a separation of the external device from the connection terminal is detected after the objects disappear, the disappeared objects may be made visible on the wallpaper (S870).

Further, in accordance with one embodiment of the present disclosure, the method can be implemented as computer-readable codes in a program-recorded medium. The computer-readable medium may include all types of recording devices each storing data readable by a computer system. Examples of such computer-readable media may include ROM, RAM, CD-ROM, magnetic tape, floppy disk, optical data storage element and the like. Also, the computer-readable medium may also be implemented as a format of carrier wave (e.g., transmission via an Internet).

The configurations and methods of the mobile terminal in the aforesaid embodiments may not be limitedly applied, but such embodiments may be configured by a selective combination of all or part of the embodiments so as to implement many variations.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
a display unit configured to display at least a plurality of objects on a wallpaper, the display unit comprising a touchscreen, wherein a portion of the wallpaper is obstructed by the plurality of objects;
a sensing unit configured to detect at least a first touch input, the first touch input comprising touches on two points of the touchscreen followed by moving from the touched two points in substantially opposite directions, one of the two points corresponding to one of the plurality of objects; and
a controller configured to control the display unit to:
change transparency of the plurality of objects, except for the one of the plurality of objects, in response to the first touch input, wherein the transparency is changed during the moving;
increase the transparency of the plurality of objects, except for the one of the plurality of objects, gradually during the moving until the moving is completed on two different points of the touchscreen, wherein a distance between the two different points is greater than a distance between the two points; and
no longer display the plurality of objects, except for the one of the plurality of objects, when the moving is completed, wherein the wallpaper including the previously obstructed portion becomes visible while the one of the plurality of objects is still displayed on the wallpaper,
wherein the controller is further configured to:
perform a function associated with the one of the plurality of objects corresponding to the one of the two points in response to a touch input received only on the one of the plurality of objects;
not perform the function in response to the first touch input when the two points are touched simultaneously; and
control the display unit to restore the transparency of the plurality of objects to have original transparency when the moving from the touched two points stops while the transparency is changed before the plurality of objects, except for the one of the plurality of objects, disappear completely and the touches remain at the stopped two points for more than a reference time.

2. The terminal of claim 1, wherein the controller is further configured to control the display unit to display additional information on the wallpaper when the plurality of objects, except for the one of the plurality of objects, is no longer displayed.

3. The terminal of claim 2, wherein:
the controller is further configured to control the display unit to re-display the plurality of objects, except for the one of the plurality of objects, in response to a second touch input received while the plurality of objects, except for the one of the plurality of objects is no longer displayed;
the second touch input comprises a first touch point and a second touch point being moved towards each other; and
the second touch input is detected after the first touch input is detected.

4. The terminal of claim 2, wherein the controller is further configured to control the display unit to display a changed wallpaper and changed additional information corresponding to the changed wallpaper when a second touch input is detected while the plurality of objects, except for the one of the plurality of objects, is no longer displayed.

5. The terminal of claim 1, wherein:
the wallpaper is divided into a first area and a second area; and
the controller is further configured to control the display unit to:
no longer display the plurality of objects, except for the one of the plurality of objects, when the first touch input is detected on the first area of the wallpaper; and
display content stored in a memory when the first touch input is detected on the second area of the wallpaper.

6. The terminal of claim 1, wherein the controller is further configured to control the display unit to display additional information on the wallpaper when a second touch input is detected while the plurality of objects, except for the one of the plurality of objects, is no longer displayed.

7. The terminal of claim 6, wherein the controller is further configured to control the display unit to display content sharing tag information related to content used as the wallpaper.

8. The terminal of claim 1, wherein the controller is further configured to control the display unit to display a shortcut button used to set the wallpaper when the plurality of objects, except for the one of the plurality of objects, is no longer displayed.

9. The terminal of claim 8, wherein:
the shortcut button is used to execute a setting mode; and
the controller is further configured to control the display unit to display content candidates that can be used as the wallpaper when the setting mode is executed using the shortcut button.

10. The terminal of claim 8, wherein:
the shortcut button is used to execute a setting mode; and
the controller is further configured to control the display unit to display a tool menu for editing the wallpaper when the setting mode is executed using the shortcut button.

11. The terminal of claim 1, wherein the controller is further configured to execute an application for managing content used as the wallpaper when the plurality of objects, except for the one of the plurality of objects, is no longer displayed.

12. The terminal of claim 11, wherein the controller is further configured to activate a voice recognition sensor and a face recognition sensor when the executed application comprises a voice recognition function and a face recognition function.

13. The terminal of claim 1, wherein:
the controller is further configured to update content displayed on the display unit as the wallpaper when the plurality of objects, except for the one of the plurality of objects, is no longer displayed; and
the update is based on current time information and current position information.

14. The terminal of claim 1, wherein the controller is further configured to:
control the display unit to display the wallpaper in a power saving mode; and
control the display unit to no longer display the wallpaper in the power saving mode when the first touch input is detected while the wallpaper is displayed.

15. The terminal of claim 1, wherein the controller is further configured to control the display unit to display at least an animation effect, a sound effect or a three-dimensional effect for content used as the wallpaper when the plurality of objects, except for the one of the plurality of objects, is no longer displayed.

16. A method for providing a user interface in a mobile terminal, the method comprising:
displaying, on a display unit comprising a touchscreen, at least a plurality of objects on a wallpaper, wherein a portion of the wallpaper is obstructed by the plurality of objects;
detecting a first touch input on the touchscreen, the first touch input comprising touches on two points of the touchscreen followed by moving from the touched two points in substantially opposite directions, one of the two points corresponding to one of the plurality of objects;
changing transparency of the plurality of objects, except for the one of the plurality of objects, in response to the first touch input, wherein the transparency is changed during the moving;
increasing the transparency of the plurality of objects, except for the one of the plurality of objects, gradually during the moving until the moving is completed on two different points of the touchscreen, wherein a distance between the two different points is greater than a distance between the two points;
no longer displaying the plurality of objects, except for the one of the plurality of objects, when the moving is completed, wherein the wallpaper including the previously obstructed portion of the wallpaper becomes visible while the one of the plurality of objects is still displayed on the wallpaper;
performing a function associated with the one of the plurality of objects corresponding to the one of the two points in response to a touch input received only on the one of the plurality of objects, wherein the function is not performed in response to the first touch input when the two points are touched simultaneously; and
restoring the transparency of the plurality of objects to have original transparency when the moving from the touched two points stops while the transparency is changed before the plurality of objects, except for the one of the plurality of objects, disappear completely and the touches remain at the stopped two points for more than a reference time.

17. The method of claim 16 further comprising displaying additional information on the wallpaper when the first touch input is detected.

18. The method of claim 16 further comprising displaying the plurality of objects on the display unit in response to a second touch input received while the plurality of objects, except for the one of the plurality of objects, is no longer displayed, wherein:
the second touch input comprises a first touch point and a second touch point being moved towards each other; and
the second touch input is detected after the first touch input is detected.

19. The method of claim 16 further comprising executing an application configured to manage content used as the wallpaper when the first touch input is detected.

20. The method of claim 16 further comprising updating content used as the wallpaper when the plurality of objects, except for the one of the plurality of objects, is no longer displayed, the updating based on current time information and current position information.

* * * * *